US012720420B2

(12) United States Patent
Vaze et al.

(10) Patent No.: US 12,720,420 B2
(45) Date of Patent: Aug. 25, 2026

(54) ARTIFICIAL INTELLIGENCE-BASED SYNCHRONIZATION SIGNAL SCANNING

(71) Applicant: QUALCOMM Incorporated, San Diego, CA (US)

(72) Inventors: Chinmay Shankar Vaze, San Diego, CA (US); Gautham Hariharan, Sunnyvale, CA (US); Kaniska Mohanty, San Diego, CA (US); Supratik Bhattacharjee, San Diego, CA (US); Kapil Bhattad, Bangalore (IN); Sreeram C Sreenivasan, Bangalore (IN); Santanu Pattanayak, Bangalore (IN); Saisruthi Kotamraju, Bengaluru (IN); Yuanning Yu, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 310 days.

(21) Appl. No.: 18/535,269

(22) Filed: Dec. 11, 2023

(65) Prior Publication Data

US 2025/0193778 A1 Jun. 12, 2025

(51) Int. Cl.

*H04W 48/16* (2009.01)
*H04L 41/16* (2022.01)
*H04W 48/10* (2009.01)

(52) U.S. Cl.

CPC ............. *H04W 48/16* (2013.01); *H04L 41/16* (2013.01); *H04W 48/10* (2013.01)

(58) Field of Classification Search

CPC ........ H04W 48/16; H04W 48/10; H04L 41/16
USPC ........................................................ 455/434
See application file for complete search history.

(56) References Cited

U.S. PATENT DOCUMENTS

| | | | | |
|---|---|---|---|---|
| 2020/0280940 | A1* | 9/2020 | Kim | H04J 11/0086 |
| 2021/0274451 | A1* | 9/2021 | Lei | H04W 8/24 |
| 2023/0127220 | A1 | 4/2023 | Ananda et al. | |
| 2024/0267762 | A1 | 8/2024 | Chai et al. | |

FOREIGN PATENT DOCUMENTS

| | | | |
|---|---|---|---|
| CN | 115103434 | A | 9/2022 |
| KR | 102401513 | B1 | 5/2022 |
| WO | 2023066346 | A1 | 4/2023 |

OTHER PUBLICATIONS

Partial International Search Report—PCT/US2024/056527—ISA/EPO—Feb. 21, 2025.

International Search Report and Written Opinion—PCT/US2024/056527—ISA/EPO—May 22, 2025.

* cited by examiner

*Primary Examiner* — Mark G. Pannell

(74) *Attorney, Agent, or Firm* — Dinsmore & Shohl LLP

(57) ABSTRACT

Certain aspects of the present disclosure provide techniques for artificial intelligence-based synchronization signal scanning. A method of wireless communications by an apparatus includes monitoring at least a first frequency bandwidth across a set of time windows. The method further includes identifying at least one synchronization signal block (SSB) centered at a global synchronization channel number (GSCN) in the first frequency bandwidth using an artificial intelligence (AI) model comprising a kernel size tuned to an SSB aspect ratio. The method further includes communicating with a network entity based at least in part on the at least one SSB.

24 Claims, 17 Drawing Sheets

200
Service Management and Orchestration (SMO) Framework
205
215
Non-Real Time RAN Intelligent Controller (RIC)
220
Core Network
Backhaul link
O1
E2
A1
O2
O-eNB
211
Near-Real Time RAN Intelligent Controller (RIC)
225
O1
E2
290
O-Cloud
210
CU
Midhaul link
Midhaul link
230
O1
Fronthaul link
DU
230
E2
DU
240
RU
Access link
104
UE
RU
240
UE
104
RU
240
UE
120
UE
104

ARTIFICIAL INTELLIGENCE-BASED SYNCHRONIZATION SIGNAL SCANNING

INTRODUCTION

Field of the Disclosure

Aspects of the present disclosure relate to wireless communications, and more particularly, to techniques for synchronization signal scanning.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

In certain wireless communications systems, a user equipment (UE) may scan for certain broadcast signals to establish a communication link with a network entity (e.g., a base station). For example, the UE may perform a full frequency scan across an entire frequency bandwidth that is available for synchronization signals (e.g., one or more synchronization signal blocks (SSBs)). The full frequency scan or other scanning techniques may consume non-trivial amounts of time and power to detect a synchronization signal. Thus, the frequency scanning and the accuracy thereof can affect the latency and/or the power consumption associated with establishing a communication link between a UE and a network entity.

Aspects described herein provide techniques for artificial intelligence (AI)-based synchronization signal scanning as well as techniques for training AI model(s) used for such synchronization signal scanning. An AI model may be trained and/or configured to detect certain features of an SSB including, for example, a time-frequency aspect ratio associated the SSB and/or any other suitable feature as further described herein. In some cases, a kernel of the AI model may be tuned to an aspect ratio of the SSB in a time-frequency grid. The AI-based synchronization signal scanning may enable improved accuracy with respect to detecting an SSB in a pre-scan. The AI-based synchronization signal scanning described herein may reduce the scan time with respect to a full frequency scan and/or other scanning techniques.

Some aspects provide a method of wireless communications by an apparatus. The method includes monitoring at least a first frequency bandwidth across a set of time windows. The method further includes identifying at least one synchronization signal block (SSB) centered at a global synchronization channel number (GSCN) in the first frequency bandwidth using an artificial intelligence (AI) model comprising a kernel size tuned to an SSB aspect ratio. The method further includes communicating with a network entity based at least in part on the at least one SSB.

Some aspects provide a method. The method includes obtaining training data comprising: a plurality of spectral energy images and a plurality of labels, wherein at least one of the plurality of labels comprises at least one indication of whether a corresponding spectral energy image comprises at least a portion of an SSB. The method further includes training an AI model with the training data to provide one or more probabilities of detecting one or more SSBs within a frequency bandwidth across a set of time windows, the frequency bandwidth comprising a plurality of GSCNs.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors, coupled to the one or more memories, configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
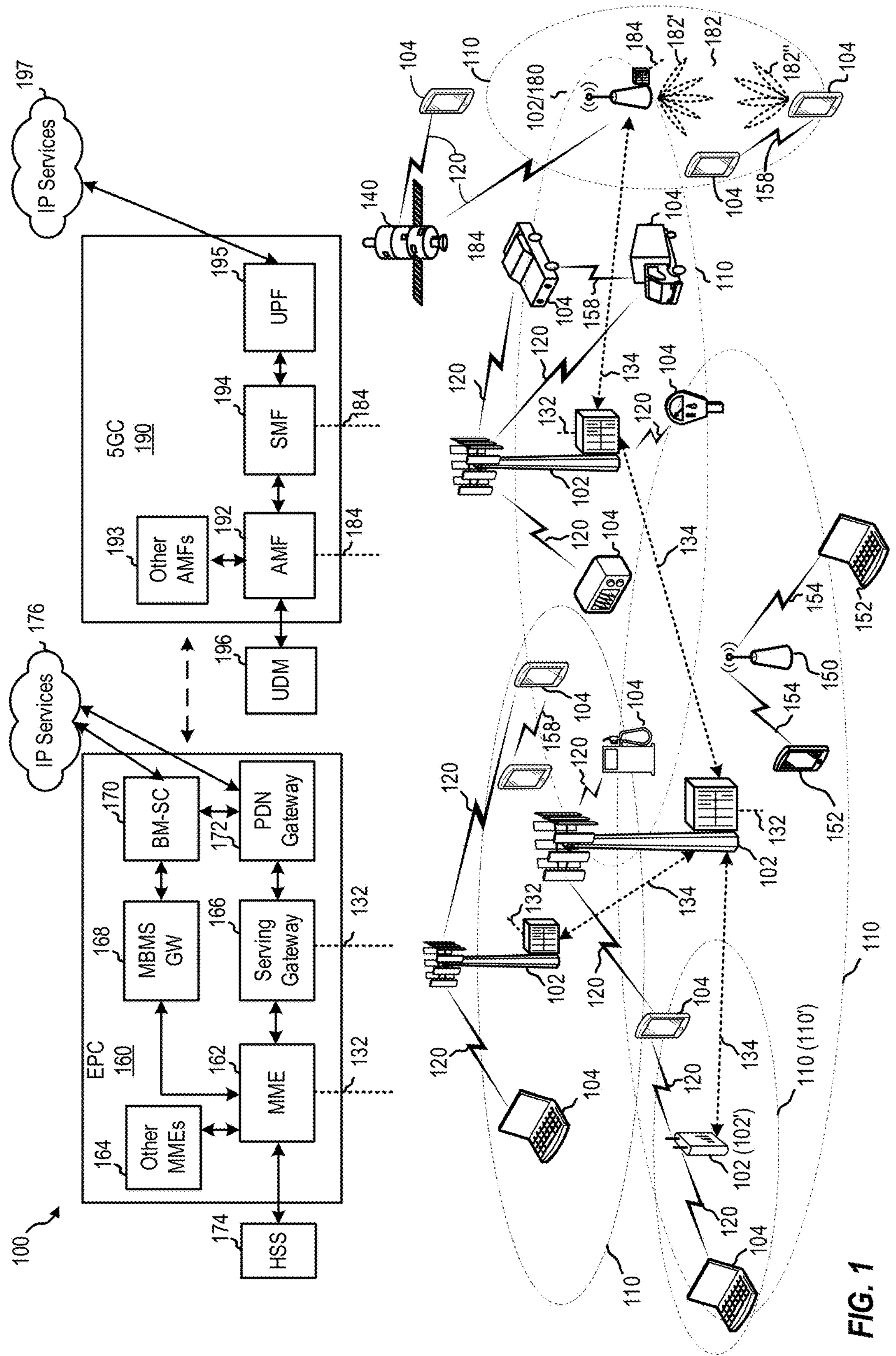
FIG. 1 depicts an example wireless communications network.

Aspects of the present disclosure provide apparatuses, methods, processing systems, and computer-readable mediums for artificial intelligence (AI)-based synchronization signal scanning.

In certain wireless communications systems (e.g., 5G New Radio systems and/or future wireless communications systems), a user equipment (UE) may scan for certain broadcast signals (e.g., synchronization signals) to establish a communication link with a network entity (e.g., a base station). For example, during initial cell acquisition, a UE may scan certain frequency resources for broadcast signals that carry synchronization information, such as an SSB, as further described herein with respect to FIG. 6. Moreover, the broadcast signals may be transmitted with a specific periodicity, for example, every 5 milliseconds (ms) to 160 ms.

Technical problems for scanning synchronization signals include, for example, the time, accuracy, and/or the power used to perform the synchronization signal scanning. As a UE may not have information regarding the frequency location of the broadcast signals and when the broadcast signals will be transmitted, the UE may scan through multiple frequency bandwidths to detect an SSB, for example, through a full frequency scan across the entire frequency bandwidth that is available for synchronization signals. As an example, the UE may perform a full frequency scan when the device switches out of an offline mode, such as a flight-mode. The offline mode involves a non-connected state where the UE refrains from transmitting radio frequency signals. The full frequency scan may consume non-trivial amounts of time and power to detect an SSB. In some cases, the UE may perform a spectral energy correlation technique in order to reduce the latency in searching for the SSB. However, such a spectral energy correlation technique can provide a false SSB detection under certain conditions, and hence, in response to a false detection, the UE may search for an SSB where no SSB is being transmitted. Thus, the frequency scanning and the accuracy of such scanning can affect the latency and/or the power consumption associated with establishing a communication link between a UE and a network entity.

Aspects described herein overcome the aforementioned technical problem(s) by providing techniques for AI-based synchronization signal scanning as well as techniques for training the AI model(s) used for such synchronization signal scanning. More specifically, an AI model (e.g., a neural network) may be trained to detect an SSB in a spectral energy image (e.g., a spectrogram or a matrix of values indicative of spectral energy over time) representative of a frequency bandwidth monitored over a specific duration (e.g., 20 ms), for example, as further described herein with respect to FIG. 13. As an example, a UE may perform a synchronization signal pre-scan that identifies candidate frequencies and/or occasions in which SSB(s) can be received. The UE may compress samples of a frequency bandwidth monitored over the duration into the spectral energy image. The UE may provide, to an AI model, the spectral energy image, and the AI model may output a probability of whether an SSB is detected in the spectral energy image, as further described herein with respect to FIGS. 10-12. In cases where an SSB is detected in a particular frequency bandwidth, the UE may perform cell acquisition using the information carried in the corresponding SSB and establish a communication link with a network entity.

The techniques for AI-based synchronization signal scanning and training thereof as described herein may provide various beneficial effects and/or advantages. The AI-based synchronization signal scanning described herein may reduce the error rate associated with detecting SSBs in a pre-scan, for example, with respect to a correlation-based energy scanning technique. For example, the AI model may be trained and/or configured to detect certain features of an SSB to enable the improved accuracy of the SSB detection. Such improved accuracy with respect to detecting an SSB may enable reduced latencies and/or power consumption for synchronization and cell acquisition. The AI-based synchronization signal scanning described herein may reduce the scan time with respect to a full frequency scan. Such a reduction in scan time may reduce the latencies and/or power consumption for synchronization and cell acquisition. The AI model training techniques described herein may enable an AI model that can adapt to various channel conditions and/or communication scenarios. For example, online training may enable the AI model to be trained under various channel conditions and/or communication scenarios. The AI model can be trained to detect SSBs under various channel conditions and/or communication scenarios including, for example, line-of-sight conditions, non-line-of-sight conditions, various UE mobility states, various transmission ranges, various frequency bands, multi-path conditions, fading, scattering, interference, noise, etc. Thus, the AI model may be capable of detecting SSBs with improved accuracy, reduced latency, and/or reduced power consumption across various channel conditions and/or communication scenarios.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects (also referred to herein as non-terrestrial network entities), such as satellite 140, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms “cell” or “serving cell” may refer to or correspond to a specific carrier frequency (e.g., a component carrier) used for wireless communications, and a “cell group” may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
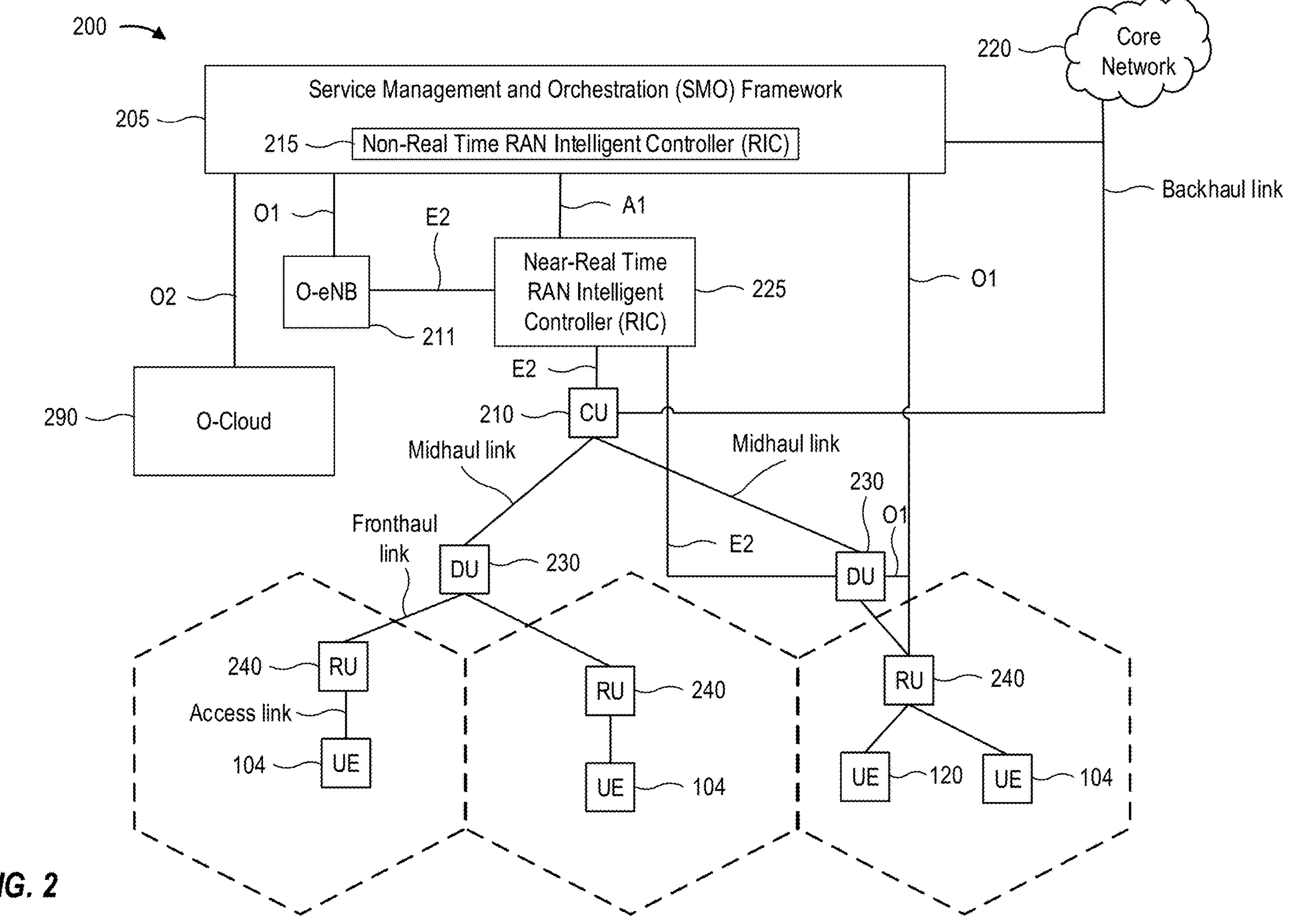
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
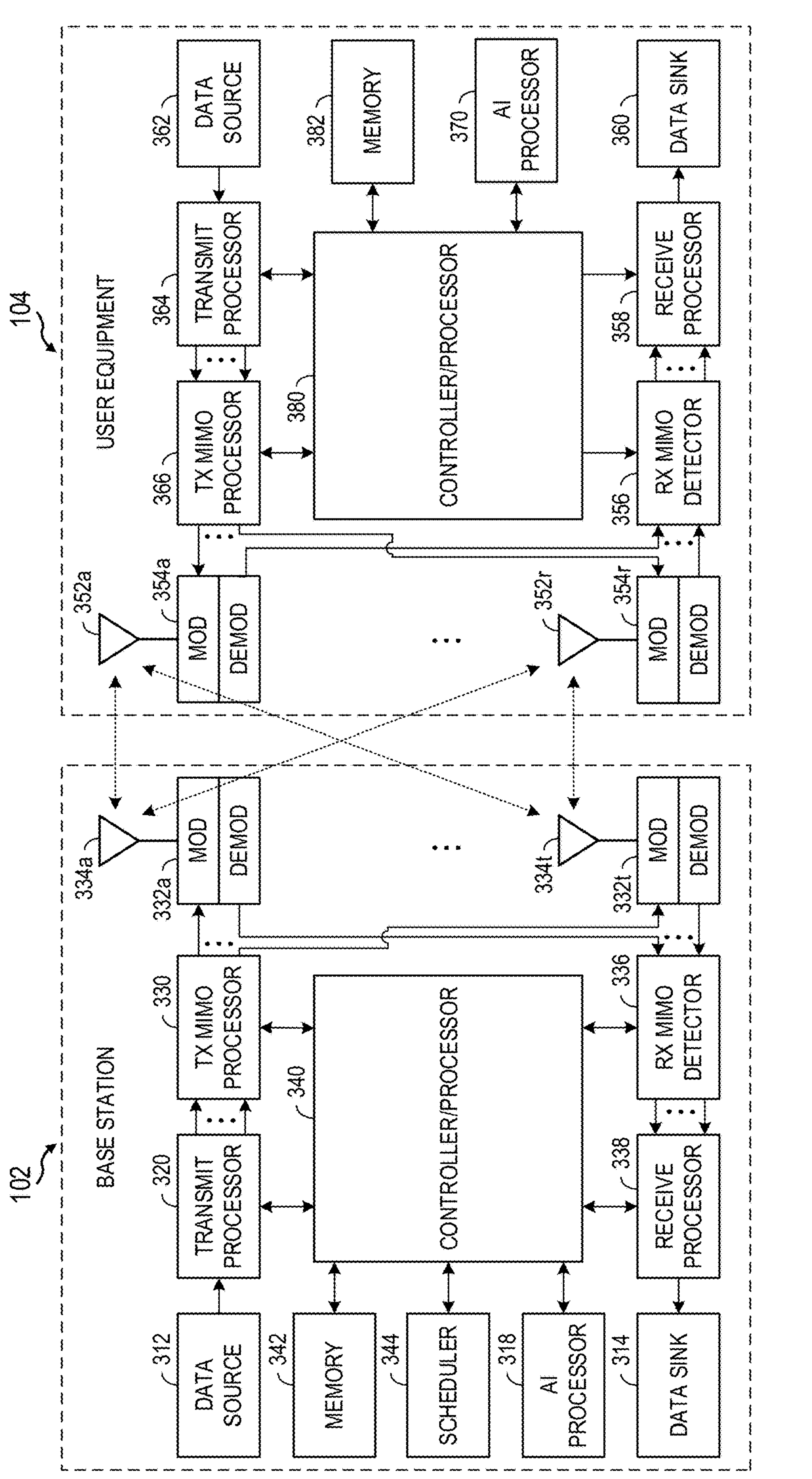
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., global navigation satellite system (GNSS) positioning). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
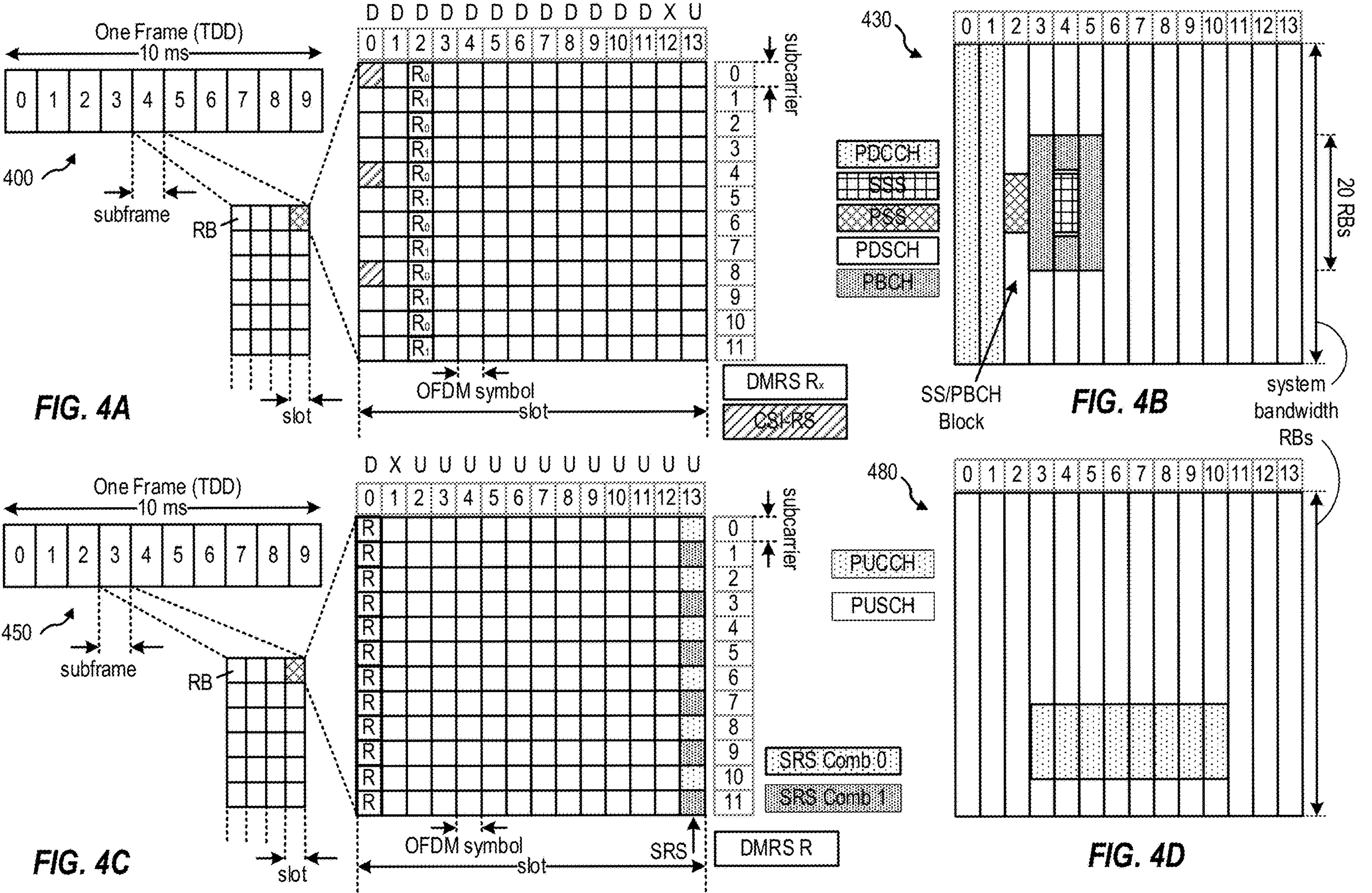
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology $\mu$, there are $2^{\mu}$ slots per subframe. Thus, numerologies ($\mu$) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times 15$ kHz, where u is the numerology 0 to 6. As an example, the numerology $\mu$=0 corresponds to a subcarrier spacing of 15 kHz, and the numerology $\mu$=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology $\mu$=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Synchronization Signal Scanning

In certain wireless communications systems (e.g., 5G NR systems and/or future wireless communications systems), a UE may scan through frequencies for synchronization signals (e.g., an SSB) broadcasted by a network entity to establish a communication link with the network entity. In some cases, the UE may perform a full frequency scan (FFS) to search for the synchronization signals. As an example, devices enabled for worldwide deployment may perform scans over thousands of candidate frequencies to search for the synchronization signals. A synchronization raster may indicate the frequency positions of the synchronization signals that can be used by the UE for system acquisition when explicit signaling of the synchronization signals position is not present (for example, via system information). The frequency position of an SSB may be defined as $SS_{REF}$ with a corresponding global synchronization channel number (GSCN), which defines the center frequency of an SSB as further described herein. As an example synchronization raster, the parameters defining the $SS_{REF}$ and GSCN for certain frequency ranges are provided in Table 1 below.

TABLE 1

GSCN parameters for the global frequency raster

| Range of frequencies (MHz) | SSB frequency position $SS_{REF}$ | GSCN | Range of GSCN |
|---|---|---|---|
| 0-3000 | N * 1200 kHz + M * 50 kHz, N = 1:2499, M ∈ {1, 3, 5} | 3N + (M-3)/2 | 2-7498 |
| 3000-24250 | 3000 MHz + N * 1.44 MHz, N = 0:14756 | 7499 + N | 7499-22255 |
| 24250-100000 | 24250.8 MHz + N * 17.28 MHz, N = 0:4383 | 22256 + N | 22256-26639 |

To perform the FFS, the UE may assume the synchronization signals are transmitted with a particular periodicity (e.g., 20 ms) centered over certain GSCNs as provided by the synchronization raster. For example, the FFS may involve the UE monitoring for SSBs over the possible GSCNs sequentially as provided in Table 1. Such a scanning operation can take a relatively long time due to the large number of possible GSCNs (e.g., thousands of GSCNs) and the varying periodicities (e.g., ranging from 5 ms to 160 ms) that can be implemented for the SSB transmissions.

Figure 5:
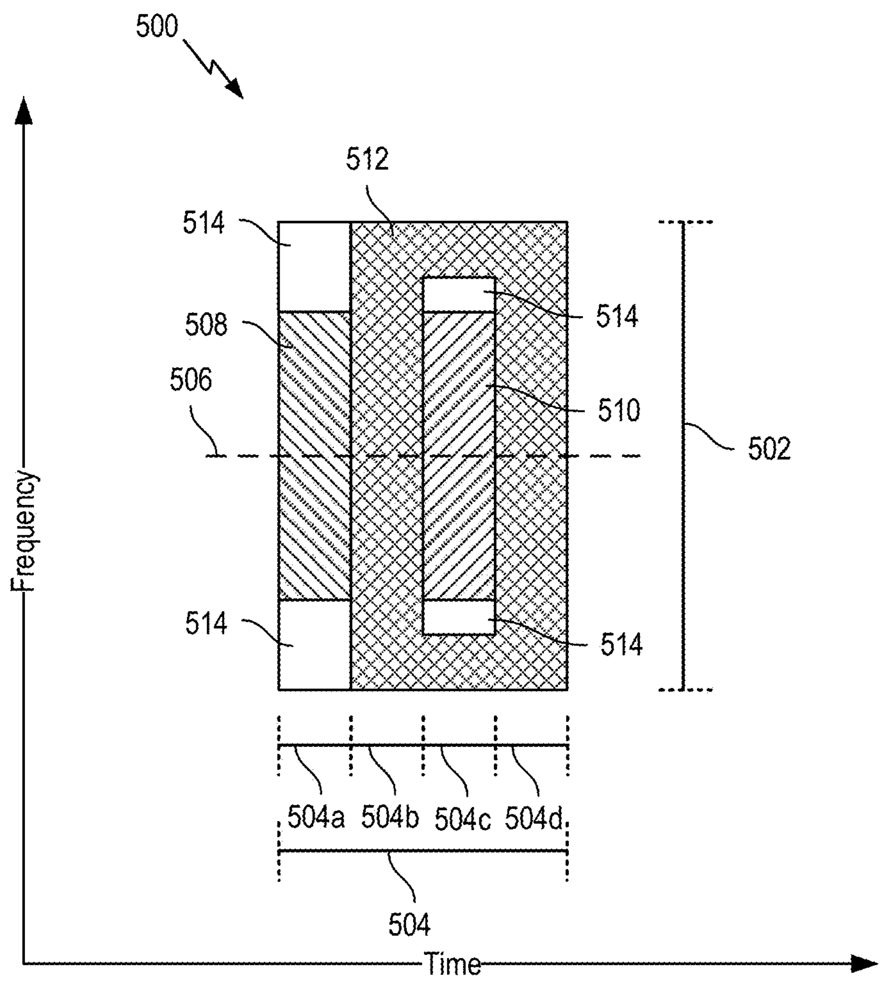
FIG. 5 illustrates an example synchronization signal block (SSB) in time-frequency domains.

FIG. 5 illustrates an example SSB 500 in time-frequency domains. In this example, the SSB 500 occupies 20 resource blocks 502 in the frequency domain and 4 symbols 504*a-d* (collectively symbols 504) in the time domain. The SSB 500 may have a center frequency 506 that corresponds to a GSCN and the $SS_{REF}$ according to a synchronization raster, such as the synchronization raster provided above in Table 1. The SSB 500 may include a primary synchronization signal (PSS) 508, a secondary synchronization signal (SSS) 510, and a physical broadcast channel (PBCH) 512. The PSS 508 occupies a first portion of the resource blocks 502 (e.g., 127 subcarriers) in the first symbol 504*a*; the SSS 510 occupies the first portion of the resource blocks 502 (e.g., 127 subcarriers) in the third symbol 504*c*; the PBCH 512 occupies the resource blocks 502 in the second symbol 504*b* and the fourth symbol 504*d*; and the PBCH 512 occupies a second portion of the resource blocks 502 (e.g., 8 resource blocks) in the fourth symbol 504*c*. Thus, there may be empty time-frequency resources 514 arranged in the first symbol 504*a* and the third symbol 504*c*. Note that the SSB 500 is merely an example structure for synchronization signaling, and other structures (e.g., different time and/or frequency domain arrangements for the PSS, SSS, and/or PBCH) may be used in addition to or instead of the structure depicted for the SSB 500. In some cases, synchronization signaling may be conveyed via a discovery reference signal having one or more synchronization signals, such as a PSS, a SSS, and/or a tertiary SS (TSS). In certain cases, some synchronization signaling may not have the PBCH.

A UE may use the PSS 508 and the SSS 510 for time and frequency synchronization for wireless communications with a network entity. As discussed herein, the PBCH 512 may carry certain system information (e.g., the MIB) that enables a UE to communicate with the network entity. Note that, in some cases, the term "SSB" may refer to a synchronization signal (SS)/physical broadcast channel (PBCH) block.

Example Artificial Intelligence for Wireless Communications

Certain aspects described herein may be implemented, at least in part, using some form of artificial intelligence (AI), e.g., the process of using a machine learning (ML) model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values.

Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, and the like.

Aspects described herein may describe the performance of certain tasks and the technical solution of various technical problems by application of a specific type of ML model, such as an ANN. It should be understood, however, that other type(s) of AI models may be used in addition to or instead of an ANN. An ML model may be an example of an AI model, and any suitable AI model may be used in addition to or instead of any of the ML models described herein. Hence, unless expressly recited, subject matter regarding an ML model is not necessarily intended to be limited to just an ANN solution or machine learning. Further, it should be understood that, unless otherwise specifically stated, terms such "AI model," "ML model," "AI/ML model," "trained ML model," and the like are intended to be interchangeable.

Figure 6:
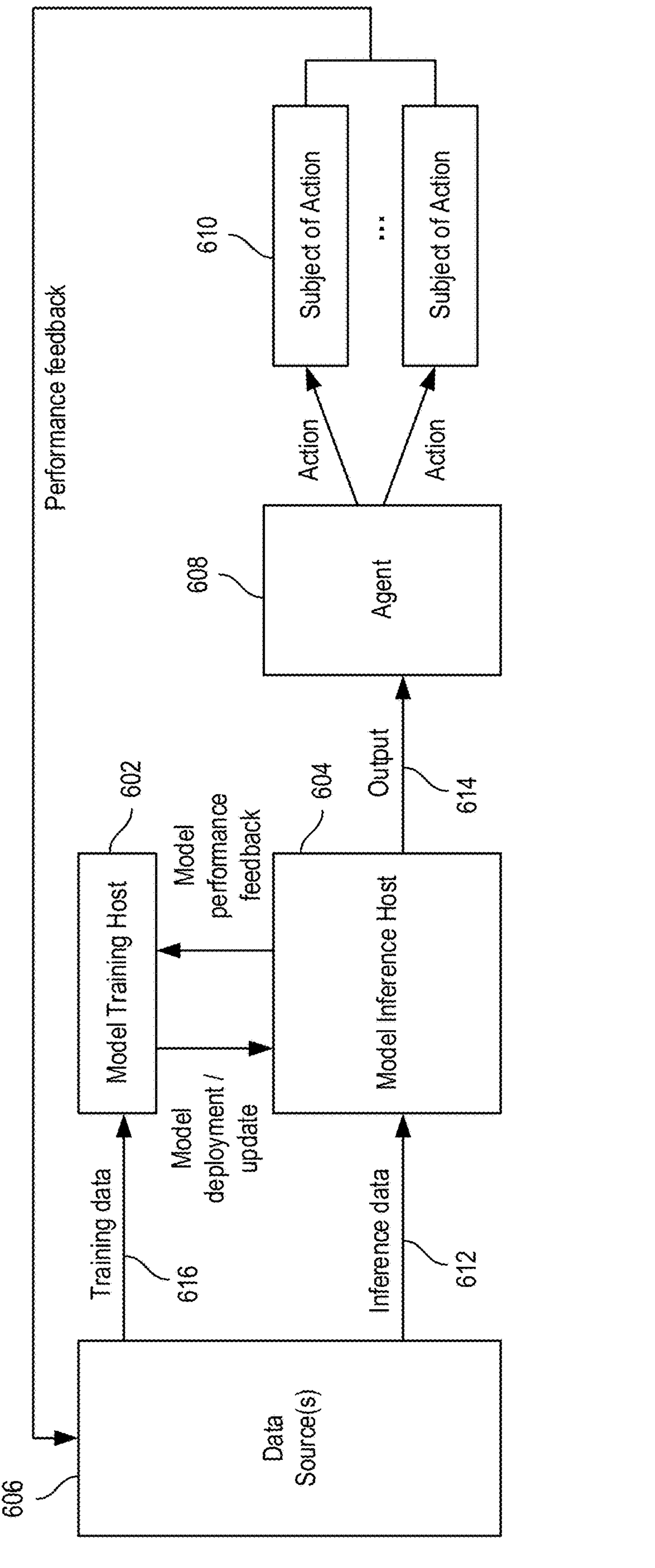
FIG. 6 illustrates an example artificial intelligence (AI) architecture that may be used for AI-enhanced wireless communications.

FIG. 6 illustrates an example AI architecture 600 that may be used for AI-enhanced wireless communications. As illustrated, the architecture 600 includes multiple logical entities, such as a model training host 602, a model inference host 604, data source(s) 606, and an agent 608. The AI architecture may be used in any of various use cases for wireless communications, such as those listed above.

The model inference host 604, in the architecture 600, is configured to run an ML model based on inference data 612 provided by data source(s) 606. The model inference host 604 may produce an output 614 (e.g., a prediction or inference, such as a discrete or continuous value) based on the inference data 612, that is then provided as input to the agent 608.

The agent 608 may be an element or an entity of a wireless communication system including, for example, a radio access network (RAN), a wireless local area network, a device-to-device (D2D) communications system, etc. As an example, the agent 608 may be a user equipment (e.g., the UE 104 in FIG. 1), a base station (e.g., the BS 102 in FIG. 1) or any disaggregated network entity thereof including a centralized unit (CU), a distributed unit (DU), and/or a radio unit (RU)), an access point, a wireless station, a RAN intelligent controller (RIC) in a cloud-based RAN, among some examples. Additionally, the type of agent 608 may also depend on the type of tasks performed by the model inference host 604, the type of inference data 612 provided to model inference host 604, and/or the type of output 614 produced by model inference host 604.

For example, if output 614 from the model inference host 604 is associated with beam management, the agent 608 may be or include a UE, a DU, or an RU. As another example, if output 614 from model inference host 604 is associated with transmission and/or reception scheduling, the agent 608 may be a CU or a DU.

After the agent 608 receives output 614 from the model inference host 604, agent 608 may determine whether to act based on the output. For example, if agent 608 is a DU or an RU and the output from model inference host 604 is associated with beam management, the agent 608 may determine whether to change or modify a transmit and/or receive beam based on the output 614. If the agent 608 determines to act based on the output 614, agent 608 may indicate the action to at least one subject of the action 610. For example, if the agent 608 determines to change or modify a transmit and/or receive beam for a communication between the agent 608 and the subject of action 610 (e.g., a UE), the agent 608 may send a beam switching indication to the subject of action 610 (e.g., a UE). As another example, the agent 608 may be a UE, the output 614 from model inference host 604 may be one or more predicted channel characteristics for one or more beams. For example, the model inference host 604 may predict channel characteristics for a set of beams based on the measurements of another set of beams. Based on the predicted channel characteristics, the agent 608, such as the UE, may send, to the subject of action 610, such as a BS, a request to switch to a different beam for communications. In some cases, the agent 608 and the subject of action 610 are the same entity.

The data sources 606 may be configured for collecting data that is used as training data 616 for training an ML model, or as inference data 612 for feeding an ML model inference operation. In particular, the data sources 606 may collect data from any of various entities (e.g., the UE and/or the BS), which may include the subject of action 610, and provide the collected data to a model training host 602 for ML model training. For example, after a subject of action 610 (e.g., a UE) receives a beam configuration from agent 608, the subject of action 610 may provide performance feedback associated with the beam configuration to the data sources 606, where the performance feedback may be used by the model training host 602 for monitoring and/or evaluating the ML model performance, such as whether the output 614, provided to agent 608, is accurate. In some examples, if the output 614 provided to agent 608 is inaccurate (or the accuracy is below an accuracy threshold), the model training host 602 may determine to modify or retrain the ML model used by model inference host 604, such as via an ML model deployment/update.

In certain aspects, the model training host 602 may deployed at or with the same or a different entity than that in which the model inference host 604 is deployed. For example, in order to offload model training processing, which can impact the performance of the model inference host 604, the model training host 602 may be deployed at a model server as further described herein. Further, in some cases, training and/or inference may be distributed amongst devices in a decentralized or federated fashion.

In some other aspects, an ML model is deployed at or on a UE for SSB pre-scanning. More specifically, a model inference host, such as model inference host 604 in FIG. 6, may be deployed at or on the UE for indicating a probability of a GSCN being a center frequency of an SSB.

Figure 7:
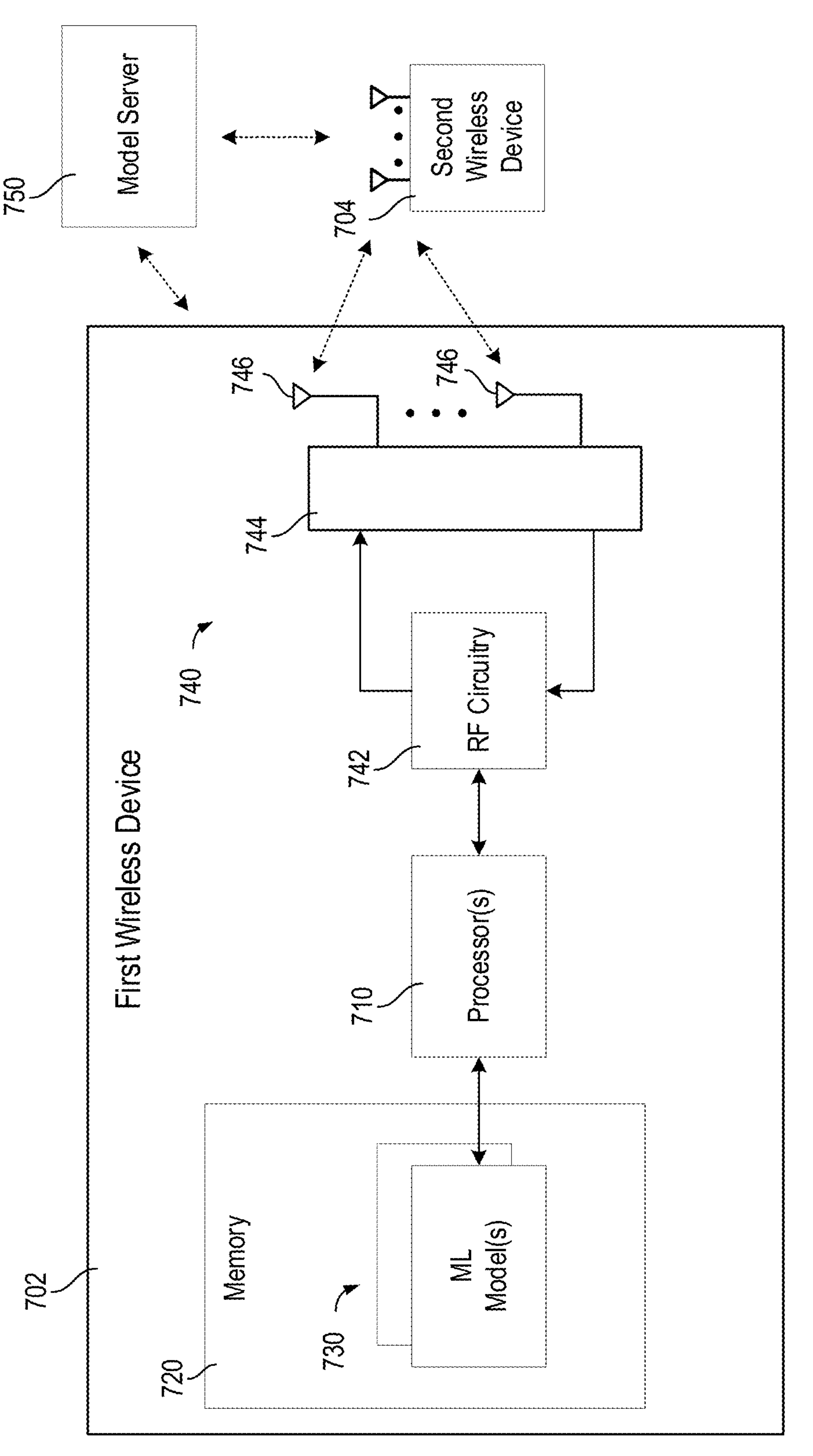
FIG. 7 illustrates an example AI architecture of a first wireless device that is in communication with a second wireless device.

FIG. 7 illustrates an example AI architecture of a first wireless device 702 that is in communication with a second wireless device 704. The first wireless device 702 may be UE 104 as described herein with respect to FIGS. 1 and 3. Similarly, the second wireless device may be BS 102 as described herein with respect to FIGS. 1 and 3. Note that the AI architecture of the first wireless device 702 may be applied to the second wireless device 704.

The first wireless device 702 may be, or may include, a chip, system on chip (SoC), system in package (SiP), chipset, package or device that includes one or more processors, processing blocks or processing elements (collectively "the processor 710") and one or more memory blocks or elements (collectively "the memory 720").

As an example, in a transmit mode, the processor 710 may transform information (e.g., packets or data blocks) into modulated symbols. As digital baseband signals (e.g., digital in-phase (I) and/or quadrature (Q) baseband signals representative of the respective symbols), the processor 710 may output the modulated symbols to a transceiver 740. The processor 710 may be coupled to the transceiver 740 for transmitting and/or receiving signals via one or more antennas 746. In this example, the transceiver 740 includes radio frequency (RF) circuitry 742, which may be coupled to the antennas 746 via an interface 744. As an example, the interface 744 may include a switch, a duplexer, a diplexer, a multiplexer, and/or the like. The RF circuitry 742 may convert the digital signals to analog baseband signals, for example, using a digital-to-analog converter. The RF circuitry 742 may include any of various circuitry, including, for example, baseband filter(s), mixer(s), frequency synthesizer(s), power amplifier(s), and/or low noise amplifier(s). In some cases, the RF circuitry 742 may upconvert the baseband signals to one or more carrier frequencies for transmission. The antennas 746 may emit RF signals, which may be received at the second wireless device 704.

In receive mode, RF signals received via the antenna 746 (e.g., from the second wireless device 704) may be amplified and converted to a baseband frequency (e.g., downconverted). The received baseband signals may be filtered and converted to digital I or Q signals for digital signal processing. The processor 710 may receive the digital I or Q signals and further process the digital signals, for example, demodulating the digital signals.

One or more ML models 730 may be stored in the memory 720 and accessible to the processor(s) 710. In certain cases, different ML models 730 with different characteristics may be stored in the memory 720, and a particular ML model 730 may be selected based on its characteristics and/or application as well as characteristics and/or conditions of first wireless device 702 (e.g., a power state, a mobility state, a battery reserve, a temperature, etc.). For example, the ML models 730 may have different inference data and output pairings (e.g., different types of inference data produce different types of output), different levels of accuracies (e.g., 80%, 90%, or 95% accurate) associated with the predictions (e.g., the output 614 of FIG. 6), different latencies (e.g., processing times of less than 10 ms, 100 ms, or 1 second) associated with producing the predictions, different ML model sizes (e.g., file sizes), different coefficients or weights, etc.

The processor 710 may use the ML model 730 to produce output data (e.g., the 614 of FIG. 6) based on input data (e.g., the inference data 612 of FIG. 6), for example, as described herein with respect to the inference host 604 of FIG. 6. The ML model 730 may be used to perform any of various AI-enhanced tasks, such as those listed above.

As further described herein with respect to FIGS. 9-12, the ML model 730 may obtain input comprising a spectral energy image. The ML model 730 may provide output indicating whether a GSCN corresponding to the center frequency of an SSB is detected in the spectral energy image. Note that other input data and/or output data may be used in addition to or instead of the examples described herein.

In certain aspects, the model server 750 may perform any of various ML model lifecycle management (LCM) tasks for the first wireless device 702 and/or the second wireless device 704. The model server 750 may operate as the model training host 602 and update the ML model 730 using training data. In some cases, the model server 750 may operate as the data source 606 to collect and host training data, inference data, and/or performance feedback associated with an ML model 730. In certain aspects, the model server 750 may host various types and/or versions of the ML models 730 for the first wireless device 702 and/or the second wireless device 704 to download.

In some cases, the model server 750 may monitor and evaluate the performance of the ML model 730 to trigger one or more LCM tasks. For example, the model server 750 may determine whether to activate or deactivate the use of a particular ML model at the first wireless device 702 and/or the second wireless device 704, and the model server 750 may provide such an instruction to the respective first wireless device 702 and/or the second wireless device 704. In some cases, the model server 750 may determine whether to switch to a different ML model 750 being used at the first wireless device 702 and/or the second wireless device 704, and the model server 750 may provide such an instruction to the respective first wireless device 702 and/or the second wireless device 704. In yet further examples, the model server 750 may also act as a central server for decentralized machine learning tasks, such as federated learning.

Example Artificial Intelligence Model

Figure 8:
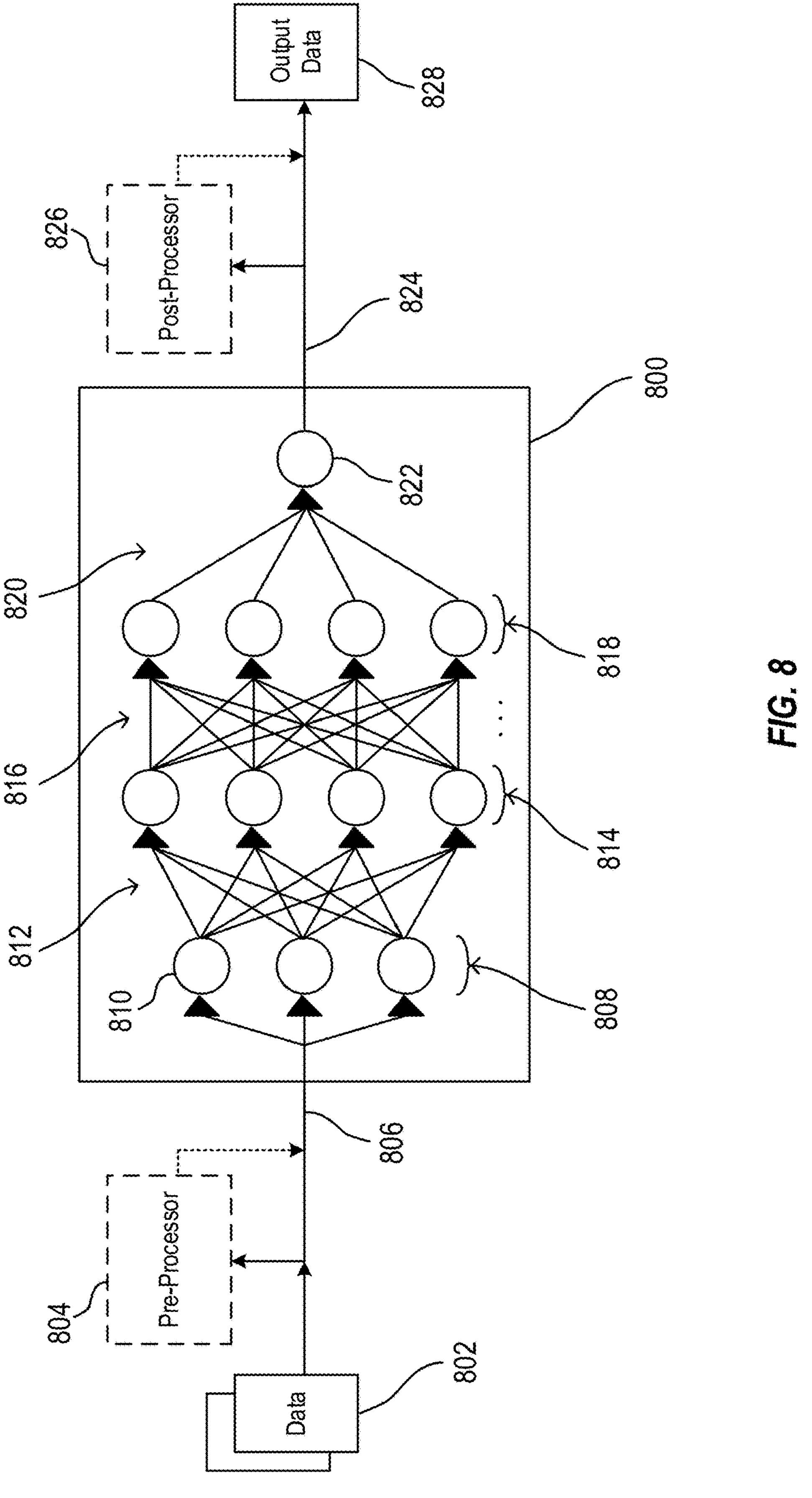
FIG. 8 illustrates an example artificial neural network.

FIG. 8 is an illustrative block diagram of an example artificial neural network (ANN) 800.

ANN 800 may receive input data 806 which may include one or more bits of data 802, pre-processed data output from pre-processor 804 (optional), or some combination thereof. Here, data 802 may include training data, verification data, application-related data, or the like, e.g., depending on the stage of development and/or deployment of ANN 800. Pre-processor 804 may be included within ANN 800 in some other implementations. Pre-processor 804 may, for example, process all or a portion of data 802 which may result in some of data 802 being changed, replaced, deleted, etc. In some implementations, pre-processor 804 may add additional data to data 802.

ANN 800 includes at least one first layer 808 of artificial neurons 810 to process input data 806 and provide resulting first layer output data via edges 812 to at least a portion of at least one second layer 814. Second layer 814 processes data received via edges 812 and provides second layer output data via edges 816 to at least a portion of at least one third layer 818. Third layer 818 processes data received via edges 816 and provides third layer output data via edges 820 to at least a portion of a final layer 822 including one or more neurons to provide output data 824. All or part of output data 824 may be further processed in some manner by (optional) post-processor 826. Thus, in certain examples, ANN 800 may provide output data 828 that is based on output data 824, post-processed data output from post-processor 826, or some combination thereof. Post-processor 826 may be included within ANN 800 in some other implementations. Post-processor 826 may, for example, process all or a portion of output data 824 which may result in output data 828 being different, at least in part, to output data 824, e.g., as result of data being changed, replaced, deleted, etc. In some implementations, post-processor 826 may be configured to add additional data to output data 824. In this example, second layer 814 and third layer 818 represent intermediate or hidden layers that may be arranged in a hierarchical or other like structure. Although not explicitly shown, there may be one or more further intermediate layers between the second layer 814 and the third layer 818.

The structure and training of artificial neurons 810 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data. Different activation functions may be used to model different types of non-linear relationships. By introducing non-linearity into an ML model, an activation function allows the ML model to "learn" complex patterns and relationships in the input data (e.g., the inference data 612 in FIG. 6). Some non-exhaustive example activation functions include a linear function, binary step function, sigmoid, hyperbolic tangent (tanh), a rectified linear unit (ReLU) or variants thereof, exponential linear unit (ELU), Swish, Softmax, and others.

Design tools (such as computer applications, programs, etc.) may be used to select appropriate structures for ANN 800 and a number of layers and a number of artificial neurons in each layer, as well as selecting activation functions, a loss function, training processes, etc. Once an initial model has been designed, training of the model may be conducted using training data. Training data may include one or more datasets within which ANN 800 may detect, determine, identify or ascertain patterns. Training data may represent various types of information, including written, visual, audio, environmental context, operational properties, etc. During training, parameters of artificial neurons 810 may be changed, such as to minimize or otherwise reduce a loss function or a cost function. A training process may be repeated multiple times to fine-tune ANN 800 with each iteration.

Various ANN model structures are available for consideration. For example, in a feedforward ANN structure each artificial neuron 810 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 800 or other ML models may be implemented in various types of processing circuits along with memory and applicable instructions therein, for example, as described herein with respect to FIGS. 6 and 7. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools are available for developing ANN models.

Aspects of Artificial Intelligence Model Training

There are a variety of model training techniques and processes that may be used prior to, or at some point following, deployment of an ML model, such as ANN 800 of FIG. 8.

As part of a model development process, information in the form of applicable training data may be gathered or otherwise created for use in training an ML model accordingly. For example, training data may be gathered or otherwise created regarding information associated with received/transmitted signal strengths, interference, and resource usage data, as well as any other relevant data that might be useful for training a model to address one or more problems or issues in a communication system. In certain instances, all or part of the training data may originate in one or more user equipments (UEs), one or more network entities, or one or more other devices in a wireless communication system. In some cases, all or part of the training data may be aggregated from multiple sources (e.g., one or more UEs, one or more network entities, the Internet, etc.). For example, wireless network architectures, such as self-organizing networks (SONs) or mobile drive test (MDT) networks, may be adapted to support collection of data for ML model applications. In another example, training data may be generated or collected online, offline, or both online and offline by a UE, network entity, or other device(s), and all or part of such training data may be transferred or shared (in real or near-real time), such as through store and forward functions or the like. Offline training may refer to creating and using a static training dataset, e.g., in a batched manner, whereas online training may refer to a real-time or near-real-time collection and use of training data. For example, an ML model at a network device (e.g., a UE) may be trained and/or fine-tuned using online or offline training. For offline training, data collection and training can occur in an offline manner at the network side (e.g., at a base station or other network entity) or at the UE side. For online training, the training of a UE-side ML model may be performed locally at the UE or by a server device (e.g., a server hosted by a UE vendor) in a real-time or near-real-time manner based on data provided to the server device from the UE.

In certain instances, all or part of the training data may be shared within a wireless communication system, or even shared (or obtained from) outside of the wireless communication system.

Once an ML model has been trained with training data, its performance may be evaluated. In some scenarios, evaluation/verification tests may use a validation dataset, which may include data not in the training data, to compare the model's performance to baseline or other benchmark information. If model performance is deemed unsatisfactory, it may be beneficial to fine-tune the model, e.g., by changing its architecture, re-training it on the data, or using different optimization techniques, etc. Once a model's performance is deemed satisfactory, the model may be deployed accordingly. In certain instances, a model may be updated in some manner, e.g., all or part of the model may be changed or replaced, or undergo further training, just to name a few examples.

As part of a training process for an ANN, such as ANN 800 of FIG. 8, parameters affecting the functioning of the artificial neurons and layers may be adjusted. For example, backpropagation techniques may be used to train the ANN by iteratively adjusting weights and/or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and/or biases to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent (or ascent) technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model.

A "dropout" technique may be used to randomly drop out some of the artificial neurons from a model during a training process, e.g., in order to reduce overfitting and potentially improve the generalization of the model.

An "early stopping" technique may be used to stop an on-going training process early, such as when a performance of the model using a validation dataset starts to degrade.

Another example technique includes data augmentation to generate additional training data by applying transformations to all or part of the training information.

A transfer learning technique may be used which involves using a pre-trained model as a starting point for training a new model, which may be useful when training data is limited or when there are multiple tasks that are related to each other.

A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ML model is some form of a "pruning" technique. A pruning technique, which may be performed during a training process or after a model has been trained, involves the removal of unnecessary (e.g., because they have no impact on the output) or less necessary (e.g., because they have negligible impact on the output), or possibly redundant features from a model. In certain instances, a pruning technique may reduce the complexity of a model or improve efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that may need to be transmitted or stored.

Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment, and less aggressively prune the model for use in a high-power or high-bandwidth environment. In certain aspects, pruning techniques also may be applied to training data, e.g., to remove outliers, etc. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting, or otherwise improve the performance of the trained model.

One or more of the example training techniques presented above may be employed as part of a training process. As above, some example training processes that may be used to train an ML model include supervised learning, unsupervised learning, semi-supervised learning, and reinforcement learning technique.

Decentralized, distributed, or shared learning, such as federated learning, may enable training on data distributed across multiple devices or organizations, without the need to centralize data or the training. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ML model to be trained on data collected from a wide range of devices and environments. For example, an ML model may be trained on data collected from a large number of wireless devices in a network, such as distributed wireless communication nodes, smartphones, or internet-of-things (IoT) devices, to improve the network's performance and efficiency. With federated learning, a user equipment (UE) or other device may receive a copy of all or part of a model and perform local training on such copy of all or part of the model using locally available training data. Such a device may provide update information (e.g., trainable parameter gradients) regarding the locally trained model to one or more other devices (such as a network entity or a server) where the updates from other-like devices (such as other UEs) may be aggregated and used to provide an update to a shared model or the like. A federated learning process may be repeated iteratively until all or part of a model obtains a satisfactory level of performance. Federated learning may enable devices to protect the privacy and security of local data, while supporting collaboration regarding training and updating of all or part of a shared model.

In some implementations, one or more devices or services may support processes relating to a ML model's usage, maintenance, activation, reporting, or the like. In certain instances, all or part of a dataset or model may be shared across multiple devices, e.g., to provide or otherwise augment or improve processing. In some examples, signaling mechanisms may be utilized at various nodes of wireless network to signal the capabilities for performing specific functions related to ML model, support for specific ML models, capabilities for gathering, creating, transmitting training data, or other ML related capabilities. ML models in wireless communication systems may, for example, be employed to support decisions relating to wireless resource allocation or selection, wireless channel condition estimation, interference mitigation, beam management, positioning accuracy, energy savings, or modulation or coding schemes, etc. In some implementations, model deployment may occur jointly or separately at various network levels, such as, a central unit (CU), a distributed unit (DU), a radio unit (RU), or the like.

Aspects Related to Artificial Intelligence-Based Synchronization Signal Scanning Aspects of the present disclosure provide techniques for AI-based synchronization signal scanning as well as techniques for training the AI model(s) used for such scanning.

Figure 9:
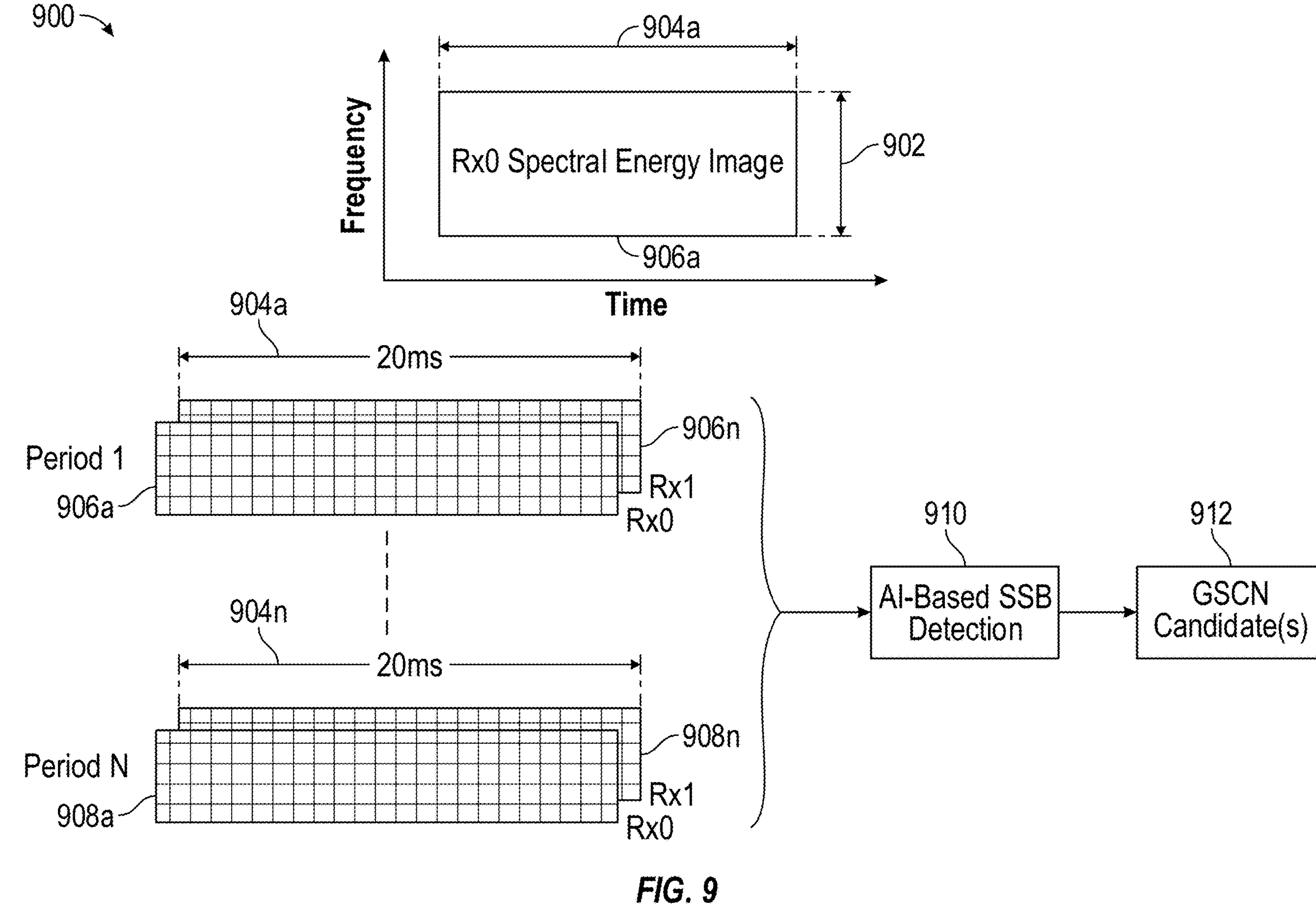
FIG. 9 illustrates example operations for performing an SSB pre-scan by a UE.

FIG. 9 illustrates example operations 900 for performing an SSB pre-scan by a UE, such as the UE 104 of FIGS. 1 and 3. In this example, a UE (e.g., the UE 104) may monitor a frequency bandwidth 902 over N number of time windows 904*a-n* (collectively the time windows 904) (e.g., Period 1 through Period N) via one or more antennas (e.g., antennas Rx0 and Rx1). The time windows 904 may be arranged consecutively in time to form a continuous monitoring time window.

In certain aspects, the UE may generate one or more spectral energy images for each of the time windows 904. As an example, the UE may obtain samples of a signal received via an antenna (Rx0) as monitored in the frequency bandwidth 902 over the first time window 904*a*. The UE may convert the samples into a first spectral energy image 906*a*, for example, as further described herein with respect to FIG. 10. A spectral energy image may be or include a time-frequency grid representing a spectral energy (e.g., a spectrogram or a matrix of values indicative of spectral energy over time) and/or an indication of the spectral energy over time. The frequency bandwidth 902 and the duration of the time window 904*a* may be selected to fit at least one SSB (e.g., the SSB 500) in the first spectral energy image 906*a*. In some cases, the UE may combine multiple spectral energy images 906*a-n* corresponding to the samples obtained via multiple antennas (e.g., antennas Rx0 and Rx1) in a given time window (e.g., the first time window 904*a*). The multiple antennas (e.g., antennas Rx0 and Rx1) may be arranged in different positions across the UE to enable spatial diversity for the pre-scanning. In some cases, the multiple antennas may be tuned to different frequency bands to enable frequency diversity for the pre-scanning, for example, as further described herein with respect to FIG. 10.

For the nth time window 904*n*, the UE may generate one or more spectral energy images 908*a-n* corresponding to the samples obtained via the antenna(s) (e.g., antennas Rx0 and Rx1), for example, as described herein with respect to the first time window 904*a*. The UE may combine the spectral energy images generated across the time windows 904 into a multi-period spectral energy image. For example, the UE may perform non-coherent combining on the spectral energy images, which may improve the performance of the image compression techniques described herein (e.g., reduced latency, memory usage, etc.).

Figure 10:
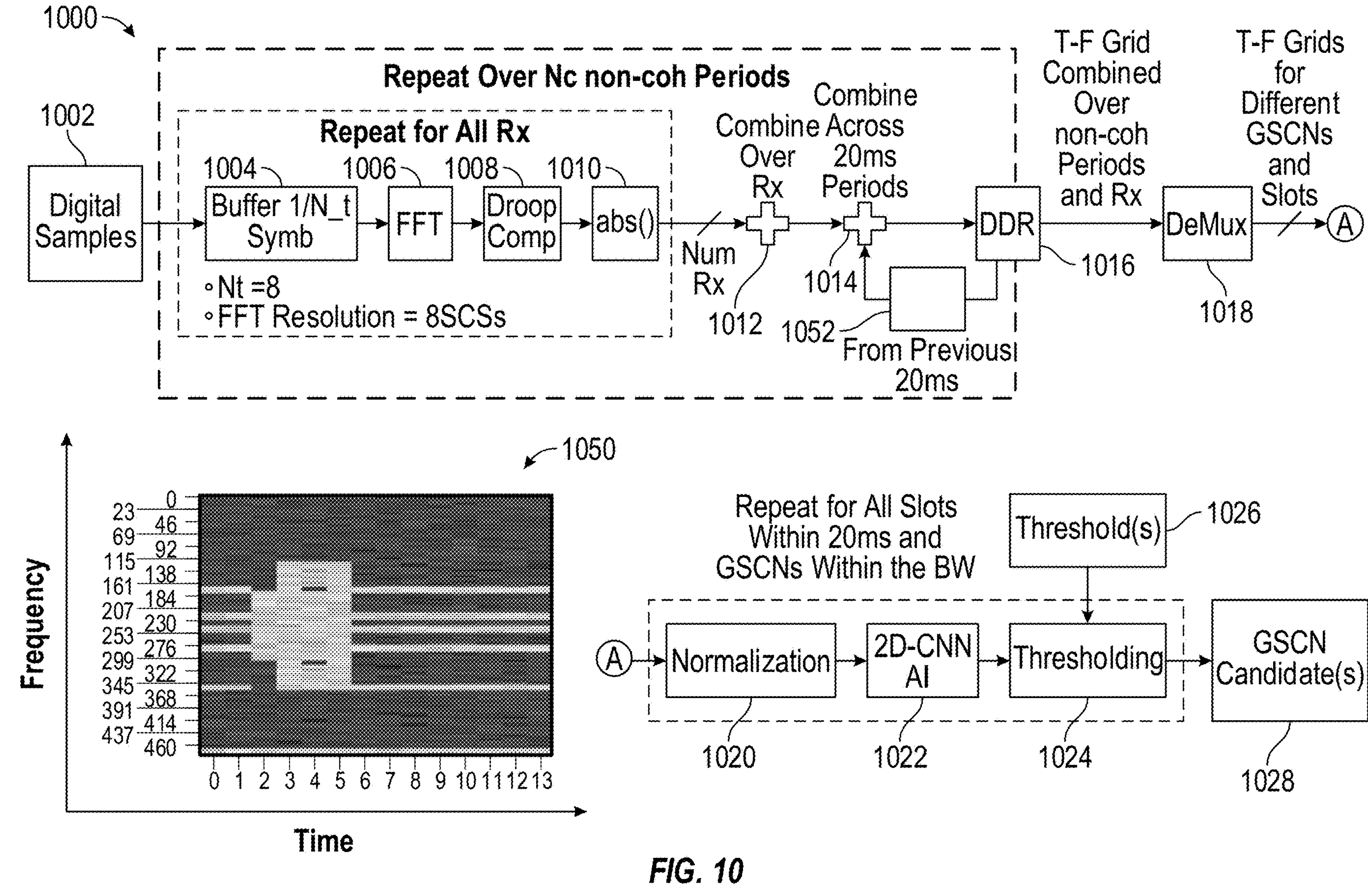
FIG. 10 illustrates example operations for performing the SSB pre-scan as described herein with respect to FIG. 9.

At 910, the UE may perform AI-based SSB detection on the combined spectral energy image, for example, as further described herein with respect to FIG. 10. The UE may predict SSB candidates using an AI model trained to detect one or more features of an SSB in the combined spectral energy image. For example, the AI model may have a kernel tuned to an aspect ratio of an SSB in a time-frequency grid. In certain aspects, the kernel may have weights tuned to detect other suitable features of the SSB. Such an AI model may enable improved accuracy at detecting an SSB in a spectral energy image, and thus, the improved accuracy of the AI-based SSB detection can reduce the latency and/or power consumption of the SSB scanning. As an example, the UE may provide, to one or more AI models (e.g., the ML model(s) 730), input including the combined spectral energy image. The AI model(s) may output an indication of whether an SSB is detected in the combined spectral energy image. In certain aspects, the AI model(s) may output an indication of GSCN candidate(s) 912 that correspond to the center frequencies of SSB(s), for example, according to a synchronization raster as described herein with respect to FIG. 5. The UE may monitor for SSBs at the center frequencies corresponding to the GSCN candidate(s) 912, and the UE may perform cell acquisition via any detected SSB.

FIG. 10 illustrates example operations 1000 for performing the SSB pre-scan as described herein with respect to FIG. 9. In this example, the UE obtains digital samples 1002 of a signal generated from monitoring a frequency bandwidth (e.g., the frequency bandwidth 902) via one or more antennas (e.g., antennas Rx0 and Rx1). The digital samples may be indicative of the RF energy in the frequency bandwidth as further described herein. As an example, the UE may monitor a frequency bandwidth using the transceiver 740 of FIG. 7. The UE may receive various radio waves in the frequency bandwidth, such as noise, interference, ambient radio waves, wireless communication signals, and/or pilot signals (e.g., the SSB 500). The UE may convert an analog signal generated using the RF circuitry 742 into a digital signal. In some cases, the UE may perform digital preprocessing operations on the digital signal (e.g., digital filtering and/or amplification) to generate the digital samples 1002.

At 1004, the UE may buffer the digital samples 1002, for example, by a downsampling ratio (e.g., $1/N_t$, where $N_t$=8). The UE may downsample the digital samples 1002 by removing a portion of the samples per OFDM symbol, for example, binning an eighth of the samples corresponding to an OFDM symbol. At 1006, the UE may perform a fast Fourier transform (FFT) on the downsampled samples, for example, at a resolution of eight subcarrier spacings (SCSs). The FFT generates a frequency domain representation of the samples. In some cases, at 1008, the UE may perform droop compensation on the frequency domain representation of the samples, for example, to flatten the frequency response.

At 1010, the UE may determine spectral energy information per symbol, for example, using an absolute value function on the frequency domain representation of the samples. The UE may arrange the spectral energy information per symbol across a time sequence forming a spectral energy image 1050 (e.g., a spectrogram or a matrix of values indicative of spectral energy over time). The spectral energy image may be a representation of the spectral energy observed in a frequency bandwidth (e.g., the frequency bandwidth 902) over a time window (e.g., the time window 904*a*). In certain cases, the spectral energy image may be or include a matrix of spectral energy values arranged in a time-frequency grid. Note that the spectral energy image 1050 is depicted at a higher sampling resolution (time and frequency) than that is discussed above. In addition, the spectral energy image 1050 depicts an example of the spectral energy over time associated with an SSB (e.g., the SSB 500), and thus, an example SSB is depicted in the spectral energy image 1050. The UE may perform the operations at 1004 through 1010 for each of the digital samples 1002 obtained from all or some of the receive antennas (e.g., the antennas Rx0 and Rx1), which may enable frequency and/or spatial diversity for the SSB pre-scanning.

At 1012, the UE may combine the spectral energy images derived from the multiple receive antennas, for example, using an averaging function (or mean or median). For example, the UE may determine the average energy of each frequency-time position in the set of spectral energy images. For example, for each time-frequency position, the UE may select, in the spectral energy images, the energy values that correspond to a particular frequency and time (e.g., the first symbol in the time window at a frequency of 3 GHz), and the UE may determine the average energy value for such energy values. Note that each frequency-time position in a spectral energy image may effectively be a pixel of the spectral energy image, and thus, the averaging function may be conceived as determining the average at each pixel across the set of spectral energy images. The combined spectral energy image formed at 1012 may be referred to as a multi-antenna spectral energy image.

At 1014, the UE may combine the multi-antenna spectral energy image of the current time window (e.g., the nth time window 904*n*) with a spectral energy image 1052 generated for the previous time window (e.g., the time window occurring before the nth time window 904*n*), which may be stored in and accessed via memory 1016 (e.g., the memory 720 in FIG. 7). For example, the UE may perform an averaging function (or mean or median) for each frequency-time position between the spectral energy images (1050 and 1052) of the current and previous time windows. If there is no previous spectral energy image, the UE may store the multi-antenna spectral energy image of the current time window in the memory 1016. In some cases, the spectral energy image 1052 may be a multi-period spectral energy image representative of the spectral energy across multiple time windows, for example, compressed into a duration of a single time window.

The UE may perform the operations at 1004 through 1014 for Nc number of time windows (e.g., the time windows 904). That is, the UE may combine the multi-antenna spectral energy images generated for Nc number of time windows into a multi-period spectral energy image as described above with respect to FIG. 9. At each iteration following the initial iteration, the UE may generate a multi-period spectral energy image representative of the combined spectral energy associated with the current spectral energy image 1050 and the previous spectral energy image 1052 and store the multi-period spectral energy image in the memory 1016 as discussed above with respect to 1014. As an example, the total number of time windows combined may be 12 for two receive antennas or 6 for four receive antennas, where each of the time windows has a duration of 20 ms. In some cases, a multi-period spectral energy image may be representative of the spectral energy over 120 ms to 240 ms compressed into a time window representative of 20 ms. Such spectral energy compression described above enables efficient processing of the SSB pre-scanning, for example, using AI-based processing as further described herein.

At any of the image combining operations described herein (e.g., at 1012 or 1014), the UE may perform non-coherent combining, which may disregard or not account for the phase associated with the images being combined. Such non-coherent combining may allow the UE to perform the image combining with improved performance, for example, reduced processing latency, reduced processing usage, reduced memory usage, etc.

At 1018, the UE may demultiplex (e.g., crop) the multi-period spectral energy image into sub-images, where each sub-image may span a portion of the bandwidth and/or time window of the source image. As an example, due to multi-antenna monitoring that supports frequency diversity (e.g., monitoring a system bandwidth), the multi-period spectral image may have spectral energy information that spans a bandwidth, such as one or more frequency ranges (e.g., the range of GSCNs including 2-7498). The demultiplexing may segment the multi-period spectral energy image into sub-images, where each sub-image represents a sub-bandwidth (e.g., 80-100 MHz) of the source image. In some cases, the demultiplexing may segment the multi-period spectral energy image into sub-images, where each sub-image represents a portion of the time window, e.g., 1 slot, of the source image. The time-frequency dimensions of a sub-image may be selected to fit at least one SSB, for example, as illustrated in the spectral energy image 1050. In certain aspects, the frequency bandwidth of a sub-image may include multiple GSCNs. In certain cases, the sub-images may overlap with each other in time and/or frequency dimension(s). In some cases, the sub-images may not overlap with each other in time and/or frequency dimension(s).

As a representative example of SSB detection for a spectral energy image, at 1020, the UE may normalize the spectral energy image obtained from the demultiplexing at 1018. For example, the spectral energy image may be normalized based on the mean and the standard deviation of the spectral energy image, for example, as further described herein with respect to FIG. 11. At 1022, the UE may provide the normalized spectral energy image to an AI model 1022 (e.g., the ML model(s) 730) trained to detect an SSB (e.g., the SSB 500) and/or an SSB occasion as further described herein with respect to FIGS. 11 and 12. In certain aspects, the AI model 1022 may be trained to detect one or more features of an SSB, such as the aspect ratio of the SSB in a time-frequency grid. For example, the AI model 1022 may have a kernel tuned to the aspect ratio of the SSB. Such training and/or configuration of the AI model 1022 may enable improved accuracy at detecting an SSB in a spectral energy image, and thus, reduce the latency and/or power consumption of the SSB scanning. In certain aspects, the AI model 1022 may be or include a convolutional neural network (CNN). As a more specific example, the AI model 1022 may be or include a two-dimensional (2D) CNN. The UE may obtain output from the AI model 1022, where the output may include a probability of detecting an SSB at a particular GSCN and the corresponding SSB occasion (e.g., symbol location). At 1024, the UE may evaluate the output of the AI model 1022 based on one or more thresholds 1026. For example, the UE may determine that a GSCN candidate corresponding to an SSB is detected in the spectral energy image if the probability is greater than or equal to the threshold(s) 1026 (e.g., ≥50%, 75%, or 95%).

The UE may repeat the operations at 1020 through 1024 for all or some of the spectral energy images obtained from the demultiplexing at 1018. For example, the UE may process the spectral energy images for all the slots within the 20 ms time window and GSCNs in the bandwidth of the multi-period spectral energy image. In certain aspects, the UE may perform the operations at 1020 through 1024 for multiple spectral energy images via parallel processing to efficiently pre-scan a bandwidth for SSBs. The UE may concurrently process the multiple spectral energy images through the AI model 1022. Through the AI-based pre-scanning, the UE may obtain GSCN candidates 1028 that correspond to the center frequencies of SSBs and/or the SSB occasion in which the SSBs may be received.

Example Convolutional Neural Network for SSB Detection

Figure 11:
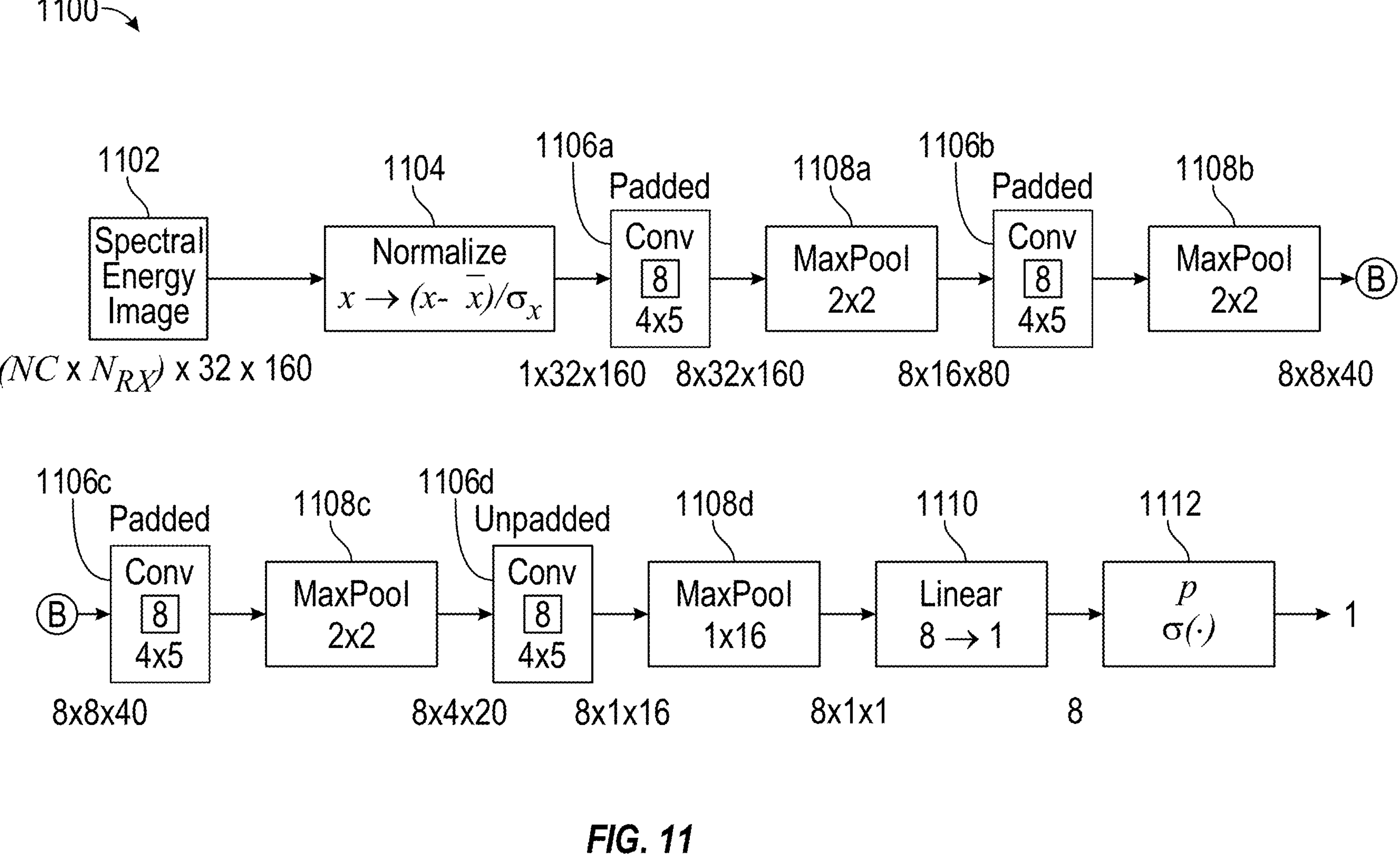
FIG. 11 illustrates an example convolutional neural network that is trained to detect an SSB.

FIG. 11 illustrates an example CNN 1100 that is trained to detect an SSB and/or an SSB occasion thereof. The CNN 1100 may be an example of the AI model 1022 as described with respect to FIG. 10 and/or an example of the ANN 800 as described with respect to FIG. 8. The CNN 1100 may include a feedforward neural network and/or a recurrent neural network. The CNN 1100 may receive input 1102, which may include a spectral energy image. In some cases, the CNN 1100 may include a pre-processor 1104, for example, as described herein with respect to FIG. 8. In this example, the pre-processor 1104 may normalize the input 1102 ($x$) according to the following expression:

$$x_{norm} = \frac{(x - \bar{x})}{\sigma_x} \quad (1)$$

where $\bar{x}$ is the mean of the input 1102, and $\sigma_x$ is the standard deviation of the input 1102. Note that the pre-processor 1104 may perform the normalization at 1020 of FIG. 10. Thus, in some cases, the normalization may be integrated with the AI model.

The CNN 1100 may process the spectral energy image of the input 1102 through a pipeline of layers. The CNN 1100 may include a plurality of convolutional layers 1106_a-d_, a set of pooling layers 1108_a-d_, and a fully connected layer 1110. As shown, at least one pooling layer is arranged between two of the convolutional layers. The first convolutional layer 1106_a_ may receive input from the pre-processor 1104 and provide output to the first pooling layer 1108_a_. The first pooling layer 1108_a_ processes the output of the first convolutional layer 1106_a_ and provides output to the second convolutional layer 1106_c_. The second convolutional layer 1108_b_ processes the output of the first pooling layer 1108_a_ and provides output to the second pooling layer 1108_b_, and so on for the subsequent convolutional layers and pooling layers arranged in the CNN 1100.

The first convolutional layer 1106*a* may include one or more filters, for example, one to eight filters. Each of the filters may output a feature map associated with the input. As an example, eight filters output eight feature maps for the spectral energy image. In certain aspects, each of the filters (or some of the filters) may be configured or trained to detect a specific feature of the SSB, for example, via specific weights or coefficients of the respective filter. A feature of the SSB (for which a filter is configured and/or trained to detect) may include, for example, the PSS, SSS, TSS, empty region(s) (e.g., the empty time-frequency resources 514), PBCH, time-frequency arrangements/dimensions thereof, a sequence signature of any SS, etc. The time-frequency arrangement(s) and/or dimension(s) may refer to the arrangement and/or dimensions of the PSS, SSS, TSS, and/or PBCH in an SSB or any other suitable synchronization signal specification, for example, as described herein with respect to FIG. 5.

In certain aspects, each of the filters (or some of the filters) may have a kernel size that is tuned to the aspect ratio of an SSB in the time-frequency domains. The kernel may have dimensions that match (or correspond to) the time-frequency dimensions of an SSB in the spectral energy image of the input 1102. The aspects ratio of the kernel (e.g., size or dimension) may match the aspect ratio of an SSB in the spectral energy image. For example, the kernel may be sized to effectively form a bounding box around an SSB in the spectral energy image of the input 1102. As an example, the kernel size may be four by five (e.g., 4×5). Note that the kernel size may depend on the time-frequency resolution of the spectral energy image of the input 1102.

In certain aspects, the first convolutional layer 1106*a* may apply padding (e.g., same padding) for the filters to enable the output to have the same dimensions as the input. The first convolutional layer 1106*a* may apply an activation layer (e.g., an activation function) to prepare the output for the next convolutional layer. The activation layer may be or include a ReLU function, for example.

A first pooling layer 1108*a* may perform a pooling operation (e.g., maximum pooling) on the input data received from the first convolutional layer 1106*a*. The first pooling layer 1108*a* may downsample the input data received from the first convolutional layer 1106*a*. In certain aspects, the first pooling layer 1108*a* may be or include a maximum pooling layer. As an example, the first pooling layer 1108*a* may have a size of two by two. Note that the first pooling layer 1108*a* may perform other types of pooling in addition to or instead of maximum pooling, such as average pooling, median pooling, etc.

In certain aspects, the first convolutional layer 1106*a* may be an example of the second convolutional layer 1106*b*, the third convolutional layer 1106*c*, and the fourth convolutional layer 1106*d*. In some cases, the second convolutional layer 1106*b* and third convolutional layer 1106*c* may have the same convolutional filtering architecture as the first convolutional layer 1106*a*. For example, each of the second convolutional layer 1106*b* and third convolutional layer 1106*c* may have a plurality of filters (e.g., eight filters) with a kernel size that is tuned to the aspect ratio of the SSB and applies padding. In some cases, the fourth convolutional layer 1106*d* may be unpadded to reduce the dimensions of the feature map extracted from the input.

In certain aspects, the first pooling layer 1108*a* may be an example of the second pooling layer 1108*b*, the third pooling layer 1108*c*, and the fourth pooling layer 1108*d*. In some cases, the second pooling layer 1108*b* and the third pooling layer 1108*c* may have the same architecture as the first pooling layer 1108*a*. For example, each of the second pooling layer 1108*b* and the third pooling layer 1108*c* may perform maximum pooling having a size of two by two. In certain cases, the fourth pooling layer 1108*d* may have a size (e.g., one by sixteen) to downsample the input obtained from the fourth convolutional layer 1106*d* into an array (e.g., eight by one) of features.

The fully connected layer 1110 may apply weights to the features extracted through the previous layers to transform the features into an output 1112 associated with SSB detection. For example, the output 1112 may include a probability of an SSB being detected in the spectral energy image of the input 1102, the corresponding center frequency GSCN for the SSB (e.g., a GSCN candidate), and/or the corresponding candidate SSB occasion(s). In certain aspects, the fully connected layer 1110 may use a sigmoid activation function. The SSB occasion may indicate when the predicted SSB is expected to occur in time. As an example, the SSB occasion may be indicated in terms of a symbol index in a slot and/or a half frame.

Aspects of Training a Machine Learning Model for SSB Detection

Figure 12:
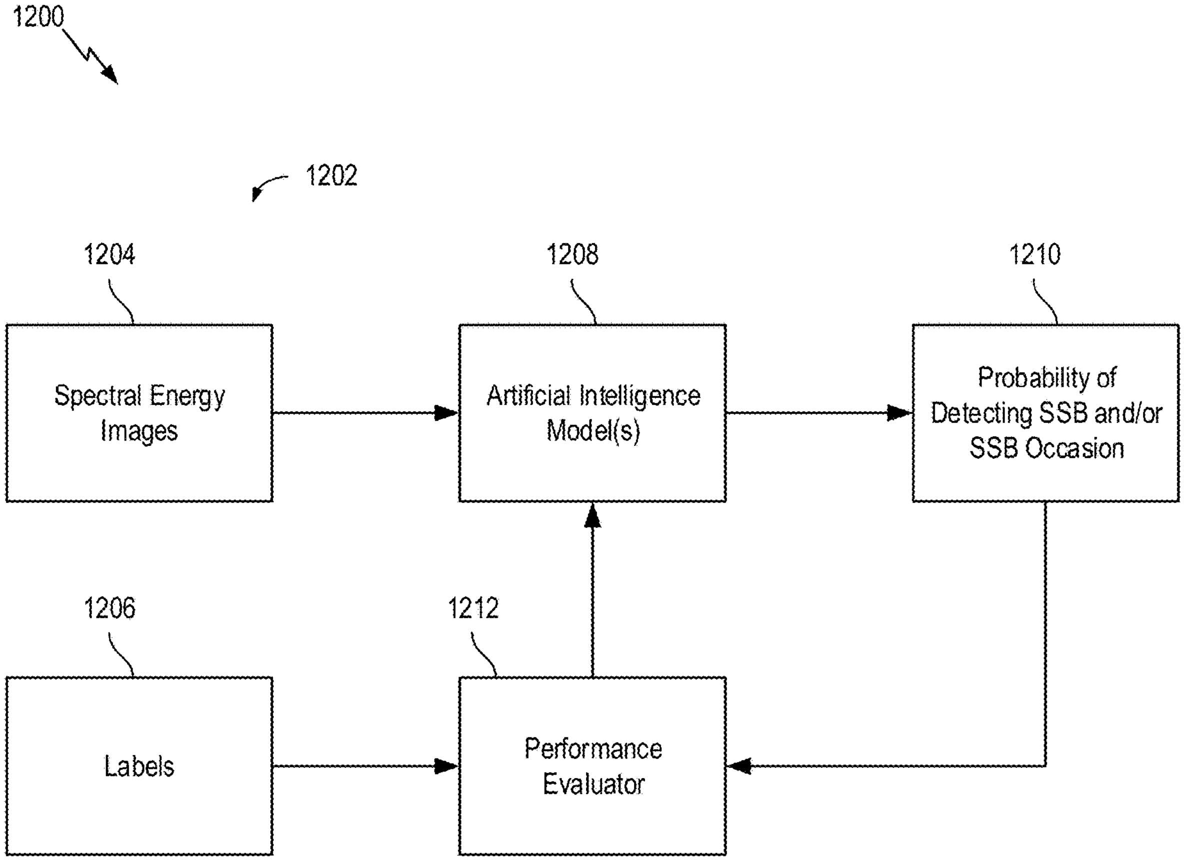
FIG. 12 illustrates example operations for training a machine learning model to detect an SSB.

FIG. 12 illustrates example operations 1200 for training an AI model to detect an SSB. The operations 1200 may be performed by a model training host (e.g., the model training host 602 of FIG. 6). In some cases, the model training host may be or include a UE (e.g., the UE 104) and/or a network entity (e.g., the BS 102). In certain aspects, the model training host may be or include a base station (e.g., the BS 102), a disaggregated entity thereof (e.g., CU 210, DU 230, and/or RU 240), a network entity of a core network (e.g., the 5GC 190), and/or a network entity of a cloud-based RAN (e.g., Near-RT RICs 225, the Non-RT RICs 215, and/or the SMO Framework 205 of FIG. 2).

The model training host obtains training data 1202 including training input data 1204 and corresponding labels 1206 for the training input data 1204. The training input data 1204 may include spectral energy images, for example, as described herein with respect to FIG. 10. The spectral energy images may be simulated (e.g., computer generated) and/or harvested from SSB scanning. In certain aspects, the spectral energy images may include a distribution of spectral energy images having an SSB or not having an SSB. In some cases, the spectral energy images may include partial SSBs where a portion of the SSB is outside the spectral energy image.

In certain aspects, the spectral energy images may include spectral energy images obtained from SSB scanning in various channel conditions. For example, the spectral energy images may include spectral energy information measured at various frequency ranges (e.g., FR1 and FR2), signal qualities (e.g., low to high signal-to-noise ratios (SNRs)), signal strengths (e.g., low to high reference signal received powers (RSRPs)), signal propagation effects (e.g., scattering, fading, Doppler effects, etc.), UE mobility states (e.g., low, medium, and high mobility), interference levels, noise levels, transmission ranges (e.g., proximity to a cell), line of sight conditions, non-line of sight conditions, etc. An AI model may be trained to detect an SSB in a wide range of channel conditions (e.g., FR1 and FR2) and/or in specific channel conditions (e.g., FR2).

Each of the labels 1206 may be associated with at least one of the spectral energy images. As an example, each of the labels 1206 may include an indication of whether any SSB is in the respective spectral energy image. In some cases, for the labels that indicate an SSB is in the respective spectral energy image, the label may include an indication of a corresponding SSB occasion (e.g., a time interval in which the SSB occurs).

The model training host provides the training input data 1204 to an AI model 1208. In certain aspects, the AI model 1208 may include the CNN 1100 of FIG. 11, and the AI model 1208 may be an example of the AI model(s) described herein with respect to FIGS. 6-10. The AI model 1208 provides an output 1210, which may include the SSB detection information as described herein with respect to FIGS. 9-11.

The model training host provides the output 1210 of the AI model 1208 to a performance evaluator 1212 that evaluates the quality and/or accuracy of the output 1210. The performance evaluator 1212 may determine whether the output 1210 matches the corresponding label of the training input data 1204. For example, the performance evaluator 1212 may determine whether the prediction that an SSB is detected in a spectral energy image is correct based on the label associated with the spectral energy image. The performance evaluator 1212 may adjust the AI model 1208 (e.g., any of the weights in a convolutional layer) to reduce a loss associated with the AI model 1208. The model training host may continue to provide the training input data 1204 to the AI model 1208 and adjust the AI model 1208 until the loss of the AI model 1208 satisfies a threshold and/or reaches a minimum loss. In certain aspects, the loss may include a sum of squared of errors (SSE) loss, an intersection of union (IoU) loss, a cross-entropy loss, or a combination thereof.

In certain aspects, the model training host may train multiple AI models. The AI models may be trained with different performance characteristics and/or for different channel conditions. For example, the AI models may be trained to detect an SSB with different levels of accuracy (e.g., accuracies of 70%, 80%, or 99%), different latencies (e.g., the processing time to predict the SSB), and/or different throughputs (e.g., the capacity to predict SSBs from one or more spectral energy images). In some cases, the AI models may be trained to detect an SSB in different channel conditions as described above. Thus, the UE may select the AI model that is capable of detecting an SSB in accordance with certain specification(s) and/or conditions, such as the current channel conditions, a specific level of power consumption, a specific latency, and/or a specific accuracy. In certain aspects, such AI models may enable the UE to perform SSB scanning with improved accuracy of detecting GSCN candidates, and thus, the improved accuracy of detecting GSCN candidates can enable reduced cell acquisition times and/or reduced power consumption.

Figure 13:
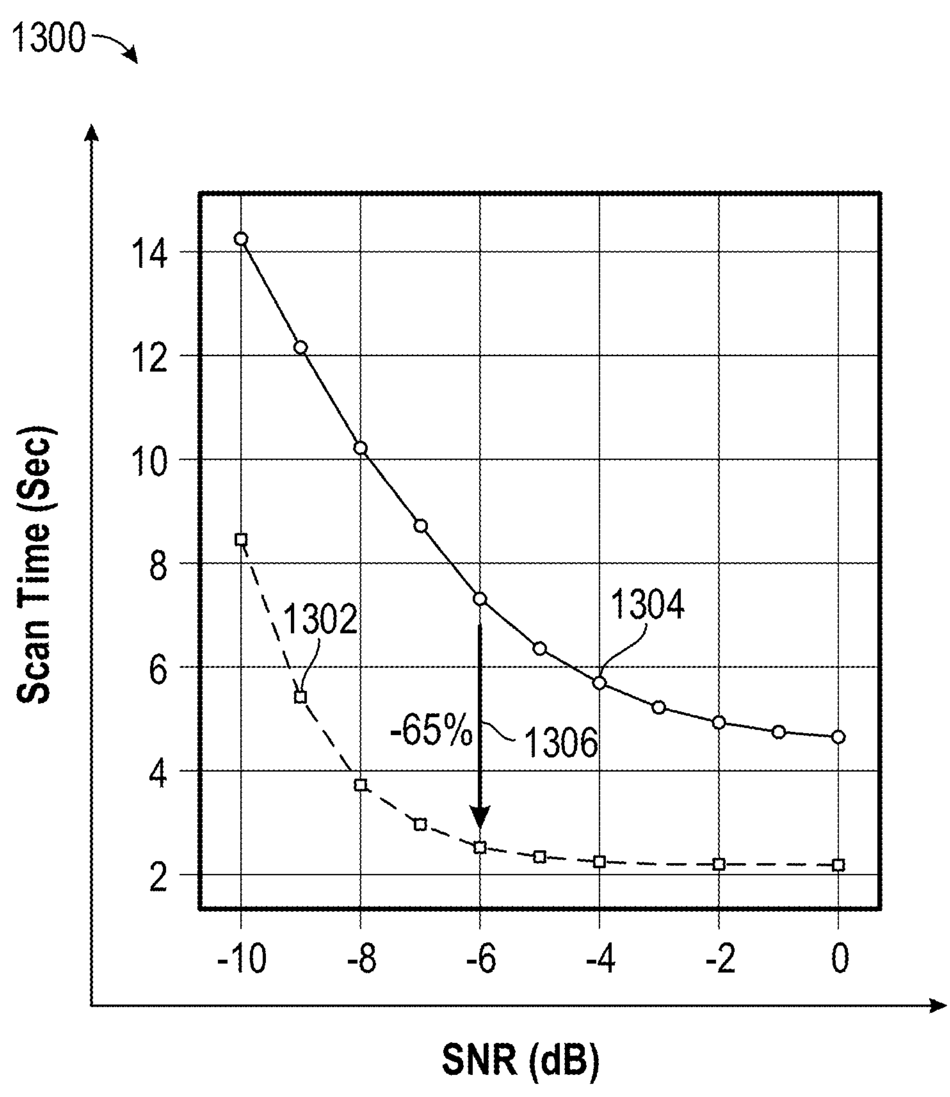
FIG. 13 illustrates example scan times for an AI-based SSB scanning technique and a full frequency scan technique.

FIG. 13 illustrates example scan times over signal qualities for an AI-based SSB scanning technique (e.g., the scanning operations 1000 of FIG. 10) and a FFS technique. As shown, a first set of scan times 1302 is associated with an AI-based SSB scanning technique, and a second set of scan times 1304 is associated with an FFS technique. The AI-based SSB scanning technique provides shorter SSB scan times compared to the FFS technique over a range of signal qualities. In some cases, the AI-based SSB scanning technique can reduce the scanning time by more than 60%. Moreover, the AI-based SSB scanning technique provides improved accuracy with respect to detecting an SSB in a frequency bandwidth using a spectral energy correlation technique. The improved accuracy may be attributable to an AI model (e.g., a CNN) configured to detect and extract various features of an SSB and/or robust AI model training, for example, as described herein with respect to FIG. 12. Thus, the AI-based SSB scanning technique described herein may enable reduced latencies and/or power consumption for synchronization and cell acquisition.

While the examples depicted in FIGS. 9-13 are described herein with respect to detecting an SSB via an AI model to facilitate understanding, aspects of the present disclosure may also be applied to other synchronization signaling schemes, such as a discovery reference signal (DRS) having one or more synchronization signals, and in some cases, not having a PBCH.

Example Operations of AI-Based SSB Scanning and Model Training

Figure 14:
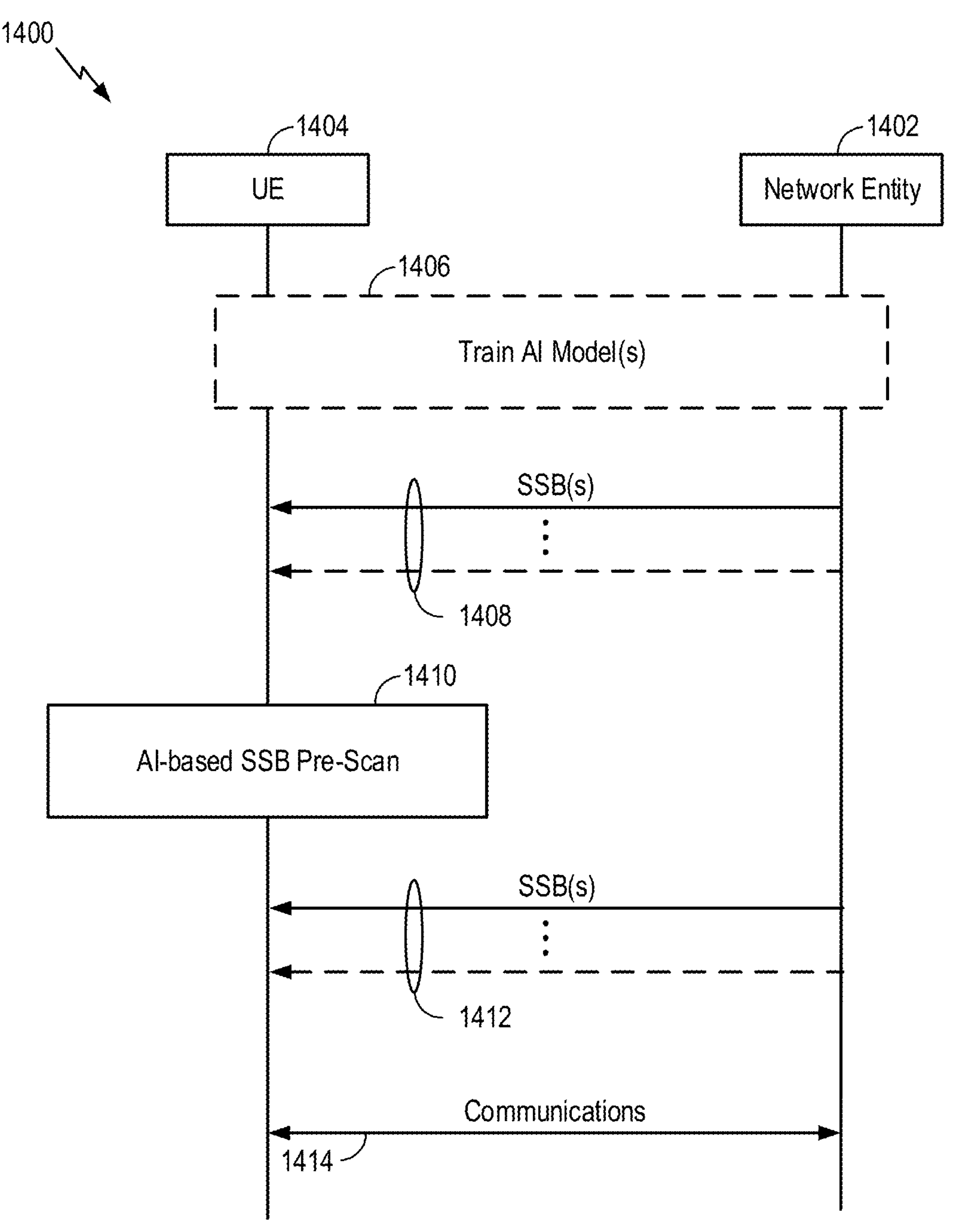
FIG. 14 depicts a process flow for communications in a system between UE and a network entity.

FIG. 14 depicts a process flow 1400 for communications in a system between a network entity 1402 and a user equipment (UE) 1404. In some aspects, the network entity 1402 may be an example of the BS 102 depicted and described with respect to FIGS. 1 and 3 or a disaggregated entity thereof as depicted and described with respect to FIG. 2. Similarly, the UE 1404 may be an example of UE 104 depicted and described with respect to FIGS. 1 and 3. However, in other aspects, UE 1404 may be another type of wireless communications device and network entity 1402 may be another type of network entity or network node, such as those described herein.

At 1406, the UE 1404 and/or the network entity 1402 may train an AI model, for example, as described herein with respect to FIG. 12. In some cases, the UE 1404 and/or the network entity 1402 may perform model training using training data collected from the UE 1404 performing SSB scanning with or without AI. In certain cases, the UE 1404 and/or the network entity 1402 may obtain training data from a data source, such as the data source 606 of FIG. 6. In certain aspects, the network entity 1402 may send, to the UE 1404, the trained AI model and/or information to reproduce the AI model. Note that the UE 1404 and/or the network entity 1402 may perform online model training and/or batched model training as described above. Thus, the UE 1404 and/or the network entity 1402 may perform the AI model training at various times.

At 1408, the UE 1404 may monitor for SSB(s) in one or more frequency bandwidths, for example, as described herein with respect to FIGS. 9 and 10. The network entity 1402 may broadcast the SSBs at certain frequencies and transmission occasions, for example, in the synchronization raster as described herein with respect to FIG. 5. The UE 1404 may generate spectral energy images indicative of the spectral energy observed in the frequency bandwidths. In some cases, the UE 1404 may receive SSB(s) while monitoring for radio waves in the frequency bandwidths.

At 1410, the UE 1404 may perform an AI-based SSB pre-scanning operation, for example, as described herein with respect to FIGS. 9-11. For example, the UE 1404 may obtain GSCN candidates from an AI model (e.g., the AI model 1022). The GSCN candidates may correspond to the center frequencies of possible SSBs.

At 1412, the UE 1404 may receive SSBs from the network entity 1402. The UE 1404 may monitor for the SSBs at the GSCN candidates obtained at 1410, and some of the GSCN candidates may be an actual center frequency of an SSB. The UE 1404 may perform time and/or frequency synchronization using the received SSBs.

At 1414, the UE 1404 may perform cell acquisition and establish a communication link with the network entity 1402. For example, the received SSBs may carry certain system information that enables the UE 1404 to establish the communication link with the network entity 1402.

Example Operations

Figure 15:
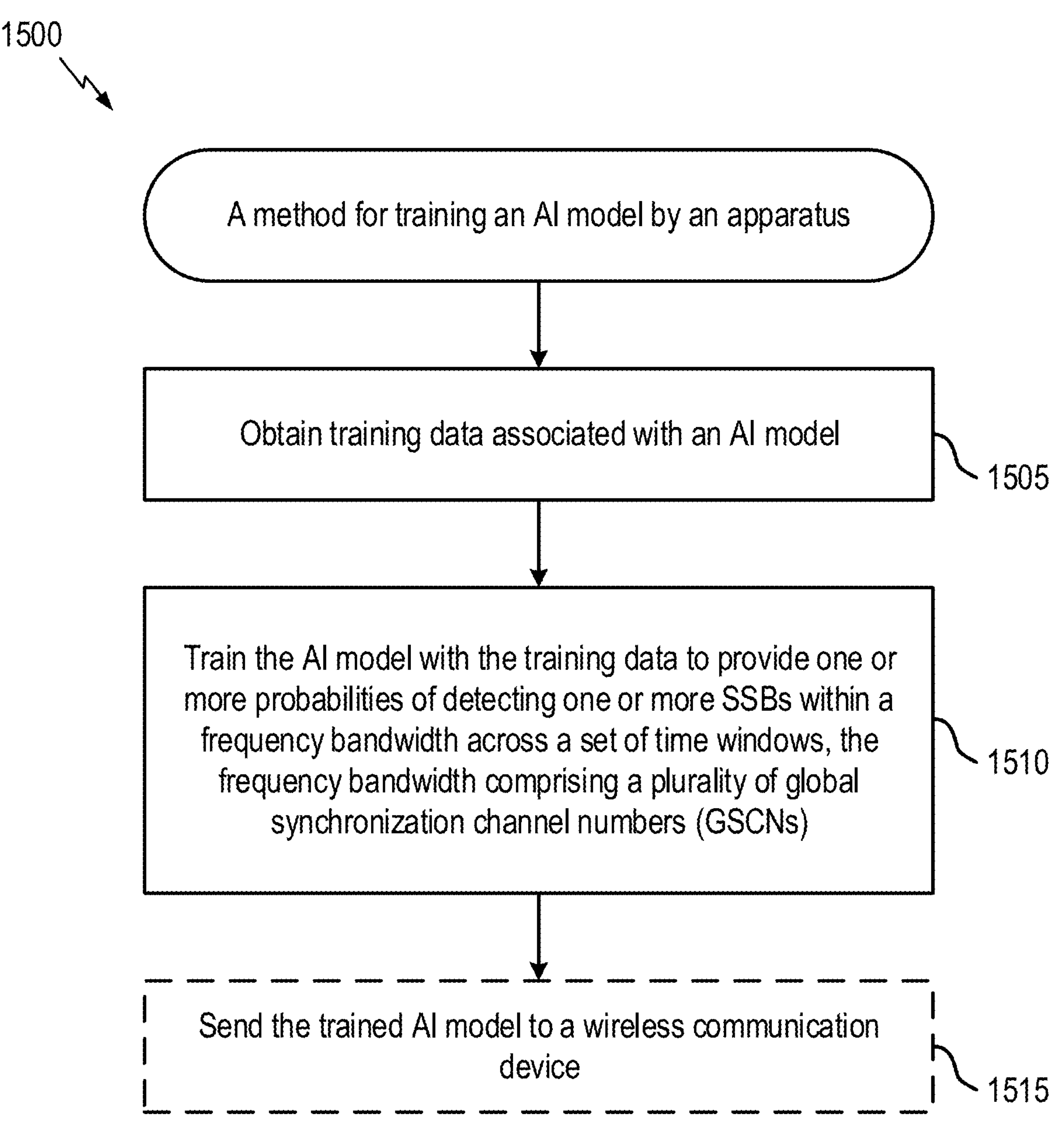
FIG. 15 depicts a method for training an AI model.

FIG. 15 shows a method 1500 for training an AI model by an apparatus, such as UE 104. In some cases, the apparatus may be or include a network entity, such as the BS 102 depicted and described with respect to FIGS. 1 and 3 or a disaggregated entity thereof as depicted and described with respect to FIG. 2. In certain cases, the apparatus may be or include the model training host 602.

Method 1500 begins at block 1505 with obtaining training data associated with an AI model, for example, as described herein with respect to FIG. 12. In certain aspects, the training data comprises a plurality of spectral energy images and a plurality of labels, wherein at least one of the plurality of labels comprises at least one indication of whether a corresponding spectral energy image comprises at least a portion of an SSB.

Method 1500 then proceeds to block 1510 with training the AI model with the training data to provide one or more probabilities of detecting one or more SSBs within a frequency bandwidth across a set of time windows, the frequency bandwidth comprising a plurality of GSCNs, for example, as described herein with respect to FIG. 12.

Method 1500 may then proceed to block 1515 with sending the trained AI model to a wireless communication device. For example, as a network entity, the apparatus may send the trained AI model (or information to reproduce the AI model) to a UE (e.g., the UE 104).

In certain aspects, each of the labels is associated with at least one of the plurality of spectral energy images. In certain aspects, at least one of the plurality of spectral energy images comprises a time-frequency grid representing a spectral energy (e.g., a spectrogram or a matrix of values indicative of spectral energy over time). In certain aspects, each of the labels comprises an indication of whether the respective spectral energy image comprises any SSB. In certain aspects, for each of the labels that indicate the respective spectral energy image comprises at least one SSB, the respective label further comprises an indication of a time interval in which the at least one SSB occurs. In certain aspects, the plurality of spectral energy images include a set of spectral energy images associated with different frequency bandwidths across a system bandwidth.

In certain aspects, the plurality of spectral energy images comprises one or more of: a first set of spectral energy images comprising at least one SSB in one or more first frequency bandwidths; a second set of spectral energy images without any SSB in one or more second frequency bandwidths; or a third set of spectral energy images comprising a first portion of the SSB in one or more third frequency bandwidths, wherein a second portion of the SSB is arranged outside the one or more third frequency bandwidths. In certain aspects, each of the first set of spectral energy images comprises the at least one SSB arranged in a different position in a time-frequency grid of the respective spectral energy image.

In certain aspects, block 1505 includes generating the training data based at least in part on scanning a system bandwidth for one or more SSBs. In certain aspects, the apparatus may generate the training data from SSB scanning with and/or without AI.

In certain aspects, block 1510 includes reducing a loss associated with the AI model based at least in part on the training data. In certain aspects, the loss comprises: a sum of squared of errors (SSE) loss; an intersection of union (IoU) loss; a cross-entropy loss; or a combination thereof.

In certain aspects, method 1500 further includes monitoring at least a first frequency bandwidth across the set of time windows. In certain aspects, method 1500 further includes identifying at least one SSB centered at a GSCN in the first frequency bandwidth using the trained AI model. In certain aspects, method 1500 further includes communicating with a network entity based at least in part on the at least one SSB.

In certain aspects, identifying at least one SSB includes: compressing a plurality of samples into a spectral energy image across a time-frequency grid based on the first frequency bandwidth and at least one time window, the plurality of samples being representative of the first frequency bandwidth across the set of time windows; providing, to the AI model, input comprising the spectral energy image; and obtaining, from the AI model, output comprising an indication that the at least one SSB is in the first frequency bandwidth.

In certain aspects, the AI model comprises a CNN having a kernel size tuned to an SSB aspect ratio, for example, as described herein with respect to FIG. 11. In certain aspects, the CNN comprises: a first convolutional layer coupled in series to a first maximum pooling layer, the first convolutional layer being padded and having a first plurality of filters; a second convolutional layer coupled to a second maximum pooling layer, the second convolutional layer being unpadded and having a second plurality of filters; and a fully connected layer having a sigmoid activation.

In certain aspects, method 1500 further includes storing the trained AI model in one or more memories. For example, the apparatus may store the trained AI model in the memory 720 of FIG. 7.

Figure 17:
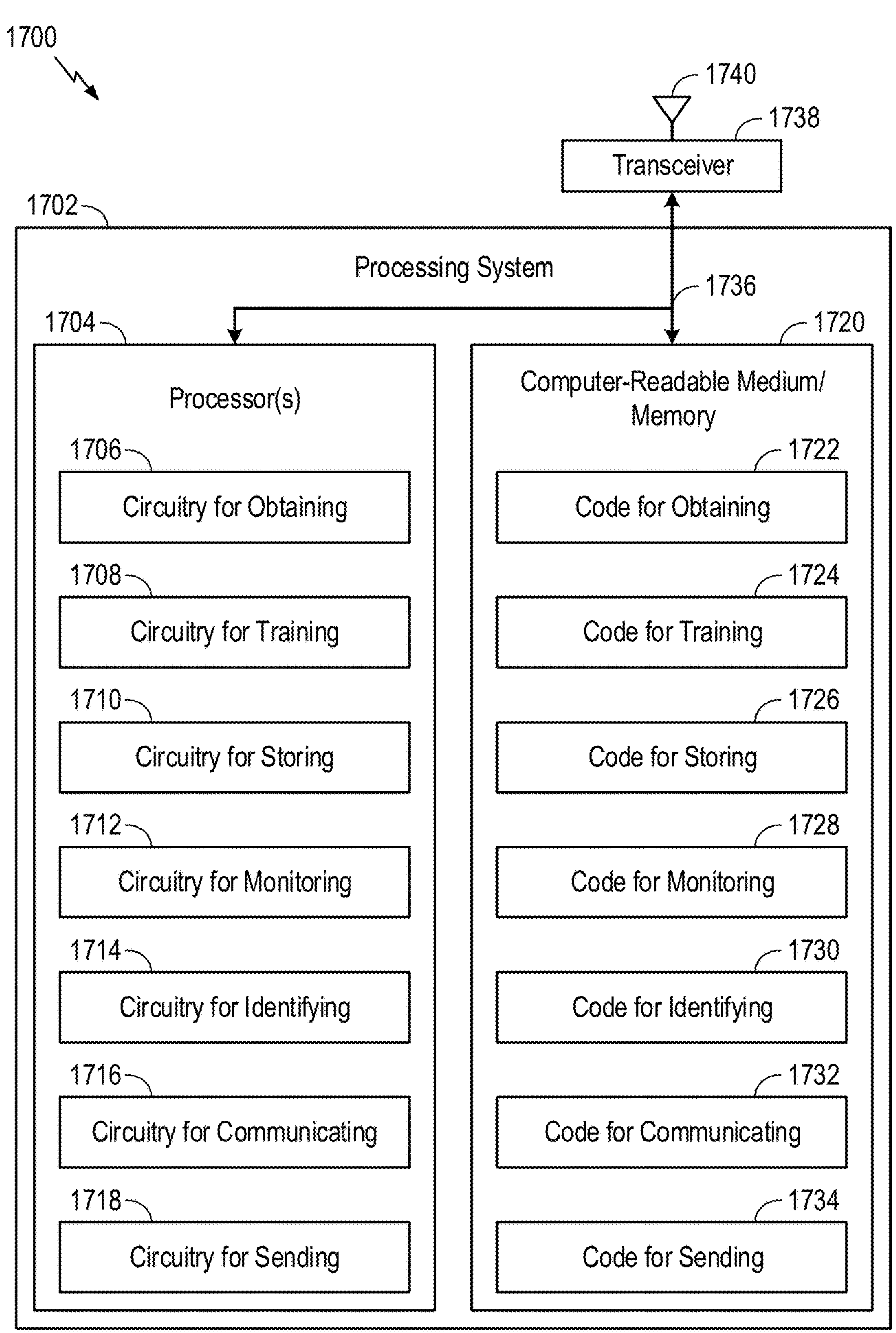
FIG. 17 depicts aspects of an example communications device.

In certain aspects, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative operations are possible consistent with this disclosure.

Figure 16:
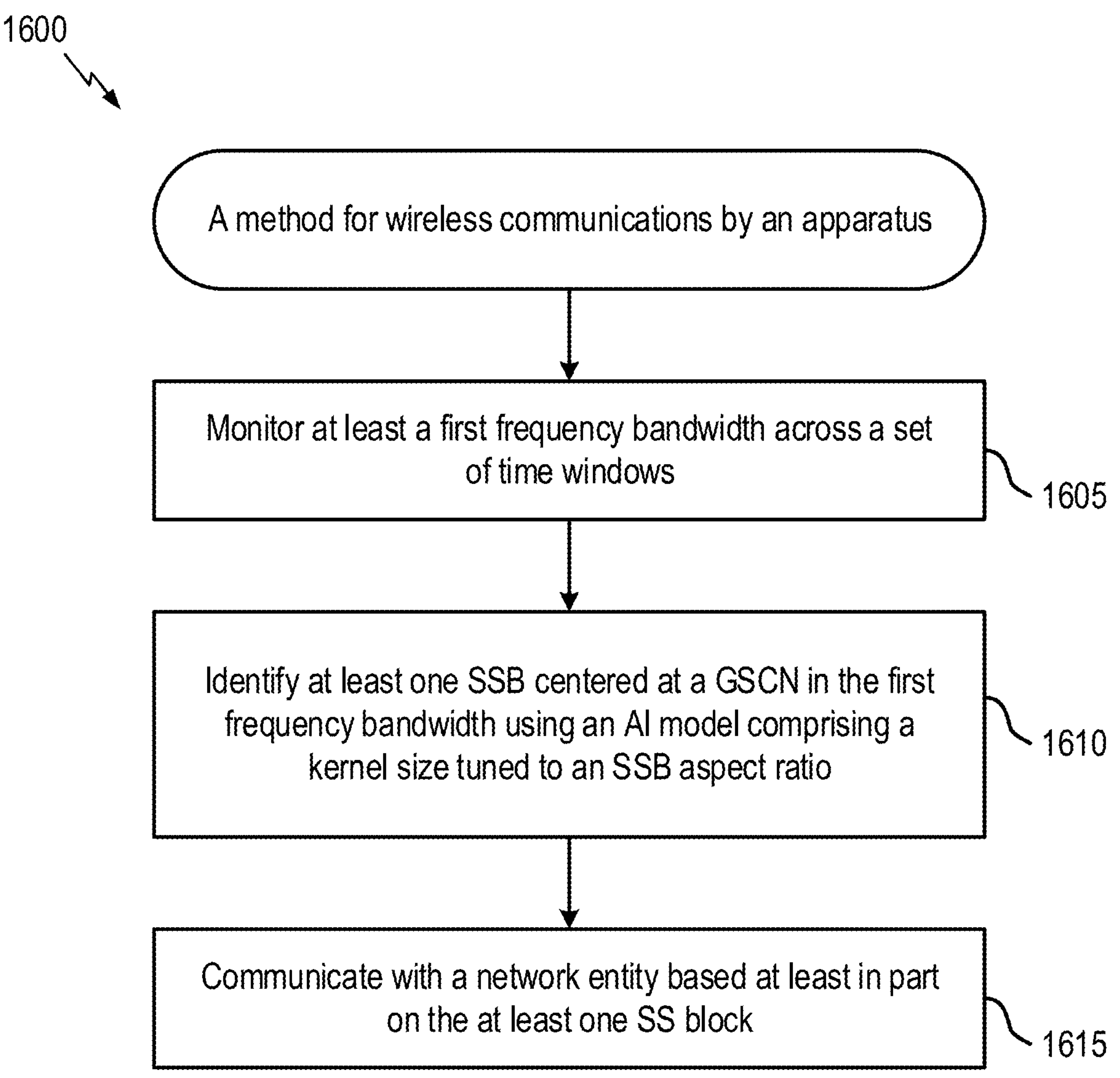
FIG. 16 depicts a method for wireless communications.

FIG. 16 shows a method 1600 for wireless communications by an apparatus, such as UE 104 of FIGS. 1 and 3.

Method 1600 begins at block 1605 with monitoring at least a first frequency bandwidth across a set of time windows, for example, as described herein with respect to FIGS. 9 and 10.

Method 1600 then proceeds to block 1610 with identifying at least one SSB centered at a GSCN in the first frequency bandwidth using an AI model comprising a kernel size tuned to an SSB aspect ratio, for example, as described herein with respect to FIGS. 10 and 11.

Method 1600 then proceeds to block 1615 with communicating with a network entity based at least in part on the at least one SSB, for example, as described herein with respect to FIG. 14.

In certain aspects, the AI model is trained to detect one or more SSB features. In certain aspects, the one or more SSB features comprise one or more of: a primary synchronization signal (PSS), a secondary synchronization signal (SSS), tertiary synchronization signal (TSS), a physical broadcast channel (PBCH), or one or more empty time-frequency resources (e.g., empty time-frequency resources 514) in an SSB. In certain aspects, the one or more SSB features comprise the time-frequency arrangement of the PSS, SSS, TSS, PBCH, and/or empty time-frequency resources in an SSB or synchronization signal specification as described herein with respect to FIG. 5. In certain aspects, the one or more SSB features comprise the time-frequency dimensions of the PSS, SSS, TSS, PBCH, and/or empty time-frequency resources in an SSB or synchronization signal specification as described herein with respect to FIG. 5.

In certain aspects, block 1610 includes: identifying at least one GSCN candidate in the first frequency bandwidth using the AI model; and searching for the at least one SSB based at least in part on the at least one GSCN candidate.

In certain aspects, method 1600 further includes: monitoring a plurality of frequency bandwidths across the set of time windows, the plurality of frequency bandwidths comprising the first frequency bandwidth; identifying at least one GSCN candidate corresponding to at least one potential SSB in the plurality of frequency bandwidths using the AI model; and searching for one or more SSBs based at least in part on the at least one GSCN candidate, the one or more SSBs comprising the at least one SSB.

In certain aspects, block 1610 includes: compressing a plurality of samples into a spectral energy image across a time-frequency grid based on the first frequency bandwidth and at least one time window, the plurality of samples being representative of the first frequency bandwidth across the set of time windows; providing, to the AI model, input comprising the spectral energy image; and obtaining, from the AI model, output comprising an indication that the at least one SSB is in the first frequency bandwidth. In certain aspects, compressing the plurality of samples into the spectral energy image comprises converting the plurality of samples into a plurality of spectral energy images, wherein each of the plurality of spectral energy images corresponds to a different time window in the set of time windows; and compressing the plurality of spectral energy images into the spectral energy image. In certain aspects, compressing the plurality of spectral energy images comprises non-coherently combining the plurality of spectral energy images into the spectral energy image, for example, as described herein with respect to FIG. 10.

In certain aspects, the AI model comprises a CNN, for example, as described herein with respect to FIG. 11. In certain aspects, the CNN comprises a plurality of convolutional layers and a fully connected output layer having a sigmoid activation. In certain aspects, the plurality of convolutional layers comprises a first convolutional layer coupled to a first maximum pooling layer, the first convolutional layer being padded and having a first plurality of filters; and a second convolutional layer coupled to a second maximum pooling layer, the second convolutional layer being unpadded and having a second plurality of filters. In certain aspects, the first plurality of filters comprises at least two, four, six, or eight filters.

In certain aspects, method 1600, or any aspect related to it, may be performed by an apparatus, such as communications device 1700 of FIG. 17, which includes various components operable, configured, or adapted to perform the method 1600. Communications device 1700 is described below in further detail.

Note that FIG. 16 is just one example of a method, and other methods including fewer, additional, or alternative operations are possible consistent with this disclosure.

Example Communications Devices

FIG. 17 depicts aspects of an example communications device 1700. In some aspects, communications device 1700 is a user equipment, such as UE 104 described above with respect to FIGS. 1 and 3. In certain aspects, communications device 1700 is a network entity, such as the BS 102 depicted and described with respect to FIGS. 1 and 3 or a disaggregated entity thereof as depicted and described with respect to FIG. 2.

The communications device 1700 includes a processing system 1702 coupled to a transceiver 1738 (e.g., a transmitter and/or a receiver). The transceiver 1738 is configured to transmit and receive signals for the communications device 1700 via an antenna 1740, such as the various signals as described herein. The processing system 1702 may be configured to perform processing functions for the communications device 1700, including processing signals received and/or to be transmitted by the communications device 1700.

The processing system 1702 includes one or more processors 1704. In various aspects, the one or more processors 1704 may be representative of one or more of receive processor 358, transmit processor 364, TX MIMO processor 366, and/or controller/processor 380, as described with respect to FIG. 3. The one or more processors 1704 are coupled to a computer-readable medium/memory 1720 via a bus 1736. In certain aspects, the computer-readable medium/memory 1720 is configured to store instructions (e.g., computer-executable code) that when executed by the one or more processors 1704, enable and cause the one or more processors 1704 to perform the method 1500 described with respect to FIG. 15, or any aspect related to it, including any additional operations described in relation to FIG. 15 and/or the method 1600 described with respect to FIG. 16, or any aspect related to it, including any additional operations described in relation to FIG. 16. Note that reference to a processor performing a function of communications device 1700 may include one or more processors performing that function of communications device 1700, such as in a distributed fashion.

In the depicted example, computer-readable medium/memory 1720 stores code for obtaining 1722, code for training 1724, code for storing 1726, code for monitoring 1728, code for identifying 1730, code for communicating 1732, code for sending 1734, or any combination thereof. Processing of the code 1722-1734 may enable and cause the communications device 1700 to perform the method 1500 described with respect to FIG. 15, or any aspect related to it, and/or the method 1600 described with respect to FIG. 16, or any aspect related to it.

The one or more processors 1704 include circuitry configured to implement (e.g., execute) the code stored in the computer-readable medium/memory 1720, including circuitry for obtaining 1706, circuitry for training 1708, circuitry for storing 1710, circuitry for monitoring 1712, circuitry for identifying 1714, circuitry for communicating 1717, circuitry for sending 1718, or any combination thereof. Processing with circuitry 1706-1718 may enable and cause the communications device 1700 to perform the method 1500 described with respect to FIG. 15, or any aspect related to it, and/or the method 1600 described with respect to FIG. 16, or any aspect related to it.

More generally, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1738 and/or antenna 1740 of the communications device 1700 in FIG. 17, and/or one or more processors 1704 of the communications device 1700 in FIG. 17. Means for communicating, receiving, monitoring, or obtaining may include the transceivers 354, antenna(s) 352, receive processor 358, and/or controller/processor 380 of the UE 104 illustrated in FIG. 3, transceiver 1738 and/or antenna 1740 of the communications device 1700 in FIG. 17, and/or one or more processors 1704 of the communications device 1700 in FIG. 17. Means for training, storing, or monitoring may include the transceivers 354, antenna(s) 352, and/or controller/processor 380 of the UE 104 illustrated in FIG. 3, transceiver 1738 and/or antenna 1740 of the communications device 1700 in FIG. 17, and/or one or more processors 1704 of the communications device 1700 in FIG. 17

Example Clauses

Implementation examples are described in the following numbered clauses:

Clause 1: A method of wireless communications by an apparatus, comprising: monitoring at least a first frequency bandwidth across a set of time windows; identifying at least one synchronization signal block (SSB) centered at a global synchronization channel number (GSCN) in the first frequency bandwidth using an artificial intelligence (AI) model comprising a kernel size tuned to an SSB aspect ratio; and communicating with a network entity based at least in part on the at least one SSB.

Clause 2: The method of Clause 1, wherein the AI model is trained to detect one or more SSB features.

Clause 3: The method of Clause 2, wherein the one or more SSB features comprise one or more of: a primary synchronization signal, a secondary synchronization signal, a physical broadcast channel, or one or more empty time-frequency resources in an SSB.

Clause 4: The method according to any of Clauses 1-3, wherein identifying the at least one SSB comprises: identifying at least one GSCN candidate in the first frequency bandwidth using the AI model; and searching for the at least one SSB based at least in part on the at least one GSCN candidate.

Clause 5: The method according to any of Clauses 1-4, further comprising: monitoring a plurality of frequency bandwidths across the set of time windows, the plurality of frequency bandwidths comprising the first frequency bandwidth; identifying at least one GSCN candidate corresponding to at least one potential SSB in the plurality of frequency bandwidths using the AI model; and searching for one or more SSBs based at least in part on the at least one GSCN candidate, the one or more SSBs comprising the at least one SSB.

Clause 6: The method according to any of Clauses 1-5, wherein identifying the at least one SSB comprises: compressing a plurality of samples into a spectral energy image across a time-frequency grid based on the first frequency bandwidth and at least one time window, the plurality of samples being representative of the first frequency bandwidth across the set of time windows; providing, to the AI model, input comprising the spectral energy image; and obtaining, from the AI model, output comprising an indication that the at least one SSB is in the first frequency bandwidth.

Clause 7: The method of Clause 6, wherein compressing the plurality of samples into the spectral energy image comprises: converting the plurality of samples into a plurality of spectral energy images, wherein each of the plurality of spectral energy images corresponds to a different time window in the set of time windows; and compressing the plurality of spectral energy images into the spectral energy image.

Clause 8: The method of Clause 7, wherein compressing the plurality of spectral energy images comprises non-coherently combining the plurality of spectral energy images into the spectral energy image.

Clause 9: The method according to any of Clauses 1-8, wherein the AI model comprises a convolutional neural network (CNN).

Clause 10: The method of Clause 9, wherein the CNN comprises a plurality of convolutional layers and a fully connected output layer having a sigmoid activation.

Clause 11: The method of Clause 10, wherein the plurality of convolutional layers comprises: a first convolutional layer coupled to a first maximum pooling layer, the first convolutional layer being padded and having a first plurality of filters; and a second convolutional layer coupled to a second maximum pooling layer, the second convolutional layer being unpadded and having second plurality of filters.

Clause 12: The method of Clause 11, wherein the first plurality of filters comprises at least eight filters.

Clause 13: A method, comprising: obtaining training data comprising: a plurality of spectral energy images and a plurality of labels, wherein at least one of the plurality of labels comprises at least one indication of whether a corresponding spectral energy image comprises at least a portion of a synchronization signal block (SSB); and training an artificial intelligence (AI) model with the training data to provide one or more probabilities of detecting one or more SSBs within a frequency bandwidth across a set of time windows, the frequency bandwidth comprising a plurality of global synchronization channel numbers (GSCNs).

Clause 14: The method of Clause 13, wherein each of the labels is associated with at least one of the plurality of spectral energy images and comprises an indication of whether the respective spectral energy image comprises at least a portion of a synchronization signal blocks (SSB).

Clause 15: The method of Clause 13 or 14, further comprising sending the trained AI model to a wireless communication device.

Clause 16: The method according to any of Clauses 13-15, wherein for each of the labels that indicate the respective spectral energy image comprises at least one SSB, the respective label further comprises an indication of a time interval in which the at least one SSB occurs.

Clause 17: The method according to any of Clauses 13-14, wherein the plurality of spectral energy images include a set of spectral energy images associated with different frequency bandwidths across a system bandwidth.

Clause 18: The method according to any of Clauses 13-15, wherein the plurality of spectral energy images comprises one or more of: a first set of spectral energy images comprising at least one SSB in one or more first frequency bandwidths; a second set of spectral energy images without any SSB in one or more second frequency bandwidths; or a third set of spectral energy images comprising a first portion of the SSB in one or more third frequency bandwidths, wherein a second portion of the SSB is arranged outside the one or more third frequency bandwidths.

Clause 19: The method of Clause 18, wherein each of the first set of spectral energy images comprises the at least one SSB arranged in a different position in a time-frequency grid of the respective spectral energy image.

Clause 20: The method according to any of Clauses 13-19, wherein obtaining the training data comprises generating the training data based at least in part on scanning a system bandwidth for any SSBs.

Clause 21: The method according to any of Clauses 13-20, wherein training the AI model comprises reducing a loss associated with the AI model based at least in part on the training data.

Clause 22: The method of Clause 21, wherein the loss comprises: a sum of squared of errors (SSE) loss; an intersection of union (IoU) loss; a cross-entropy loss; or a combination thereof.

Clause 23: The method according to any of Clauses 13-22, further comprising: monitoring at least a first frequency bandwidth across the set of time windows; identifying at least one SSB centered at a GSCN in the first frequency bandwidth using the trained AI model; and communicating with a network entity based at least in part on the at least one SSB.

Clause 24: The method of Clause 23, wherein identifying the at least one SSB comprises: compressing a plurality of samples into a spectral energy image across a time-frequency grid based on the first frequency bandwidth and at least one time window, the plurality of samples being representative of the first frequency bandwidth across the set of time windows; providing, to the AI model, input comprising the spectral energy image; and obtaining, from the AI model, output comprising an indication that the at least one SSB is in the first frequency bandwidth.

Clause 25: The method according to any of Clauses 13-24, wherein the AI model comprises a convolutional neural network (CNN) having a kernel size tuned to an SSB aspect ratio.

Clause 26: The method of Clause 25, wherein the CNN comprises: a first convolutional layer coupled in series to a first maximum pooling layer, the first convolutional layer being padded and having a first plurality of filters; a second convolutional layer coupled to a second maximum pooling layer, the second convolutional layer being unpadded and having a second plurality of filters; and a fully connected layer having a sigmoid activation.

Clause 27: One or more apparatuses, comprising: one or more memories; and one or more processors coupled to the one or more memories, the one or more processors being configured to cause the one or more apparatuses to perform a method in accordance with any of Clauses 1-26.

Clause 28: One or more apparatuses, comprising means for performing a method in accordance with any of Clauses 1-26.

Clause 29: One or more non-transitory computer-readable media comprising executable instructions that, when executed by one or more processors of one or more apparatuses, cause the one or more apparatuses to perform a method in accordance with any of Clauses 1-26.

Clause 30: One or more computer program products embodied on one or more computer-readable storage media comprising code for performing a method in accordance with any of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:
- one or more memories; and
- one or more processors coupled to the one or more memories, the one or more processors being configured to cause the apparatus to:
  - monitor at least a first frequency bandwidth across a set of time windows;
  - identify at least one synchronization signal block (SSB) centered at a global synchronization channel number (GSCN) in the first frequency bandwidth using an artificial intelligence (AI) model comprising a kernel size tuned to an SSB aspect ratio; and
  - communicate with a network entity based at least in part on the at least one SSB.

2. The apparatus of claim 1, wherein the AI model is trained to detect one or more SSB features.

3. The apparatus of claim 2, wherein the one or more SSB features comprise one or more of: a primary synchronization signal, a secondary synchronization signal, a physical broadcast channel, or one or more empty time-frequency resources in an SSB.

4. The apparatus of claim 1, wherein to identify the at least one SSB, the one or more processors are configured to cause the apparatus to:
- identify at least one GSCN candidate in the first frequency bandwidth using the AI model; and
- search for the at least one SSB based at least in part on the at least one GSCN candidate.

5. The apparatus of claim 1, wherein the one or more processors are configured to cause the apparatus to:
- monitor a plurality of frequency bandwidths across the set of time windows, the plurality of frequency bandwidths comprising the first frequency bandwidth;
- identify at least one GSCN candidate corresponding to at least one potential SSB in the plurality of frequency bandwidths using the AI model; and
- search for one or more SSBs based at least in part on the at least one GSCN candidate, the one or more SSBs comprising the at least one SSB.

6. The apparatus of claim 1, wherein to identify the at least one SSB, the one or more processors are configured to cause the apparatus to:
- compress a plurality of samples into a spectral energy image across a time-frequency grid based on the first frequency bandwidth and at least one time window, the plurality of samples being representative of the first frequency bandwidth across the set of time windows;
- provide, to the AI model, input comprising the spectral energy image; and
- obtain, from the AI model, output comprising an indication that the at least one SSB is in the first frequency bandwidth.

7. The apparatus of claim 6, wherein to compress the plurality of samples into the spectral energy image, the one or more processors are configured to cause the apparatus to:
- convert the plurality of samples into a plurality of spectral energy images, wherein each of the plurality of spectral energy images corresponds to a different time window in the set of time windows; and
- compress the plurality of spectral energy images into the spectral energy image.

8. The apparatus of claim 7, wherein to compress the plurality of spectral energy images, the one or more processors are configured to cause the apparatus to non-coherently combine the plurality of spectral energy images into the spectral energy image.

9. The apparatus of claim 1, wherein the AI model comprises a convolutional neural network (CNN).

10. The apparatus of claim 9, wherein the CNN comprises a plurality of convolutional layers and a fully connected output layer having a sigmoid activation.

11. The apparatus of claim 10, wherein the plurality of convolutional layers comprises:
- a first convolutional layer coupled to a first maximum pooling layer, the first convolutional layer being padded and having a first plurality of filters; and
- a second convolutional layer coupled to a second maximum pooling layer, the second convolutional layer being unpadded and having a second plurality of filters.

12. The apparatus of claim 11, wherein the first plurality of filters comprises at least eight filters.

13. A method of wireless communications by an apparatus, comprising:
- monitoring at least a first frequency bandwidth across a set of time windows;
- identifying at least one synchronization signal block (SSB) centered at a global synchronization channel number (GSCN) in the first frequency bandwidth using an artificial intelligence (AI) model comprising a kernel size tuned to an SSB aspect ratio; and communicating with a network entity based at least in part on the at least one SSB.

14. The method of claim 13, wherein the AI model is trained to detect one or more SSB features.

15. The method of claim 14, wherein the one or more SSB features comprise one or more of: a primary synchronization signal, a secondary synchronization signal, a physical broadcast channel, or one or more empty time-frequency resources in an SSB.

16. The method of claim 13, wherein identifying the at least one SSB, comprises:

identifying at least one GSCN candidate in the first frequency bandwidth using the AI model; and searching for the at least one SSB based at least in part on the at least one GSCN candidate.

17. The method of claim 13, further comprising:

monitoring a plurality of frequency bandwidths across the set of time windows, the plurality of frequency bandwidths comprising the first frequency bandwidth;

identifying at least one GSCN candidate corresponding to at least one potential SSB in the plurality of frequency bandwidths using the AI model; and searching for one or more SSBs based at least in part on the at least one GSCN candidate, the one or more SSBs comprising the at least one SSB.

18. The method of claim 13, wherein identifying the at least one SSB comprises:

compressing a plurality of samples into a spectral energy image across a time-frequency grid based on the first frequency bandwidth and at least one time window, the plurality of samples being representative of the first frequency bandwidth across the set of time windows;

providing, to the AI model, input comprising the spectral energy image; and obtaining, from the AI model, output comprising an indication that the at least one SSB is in the first frequency bandwidth.

19. The method of claim 18, wherein compressing the plurality of samples into the spectral energy image comprises:

converting the plurality of samples into a plurality of spectral energy images, wherein each of the plurality of spectral energy images corresponds to a different time window in the set of time windows; and compressing the plurality of spectral energy images into the spectral energy image.

20. The method of claim 19, wherein compressing the plurality of spectral energy images comprises non-coherently combining the plurality of spectral energy images into the spectral energy image.

21. The method of claim 13, wherein the AI model comprises a convolutional neural network (CNN).

22. The method of claim 21, wherein the CNN comprises a plurality of convolutional layers and a fully connected output layer having a sigmoid activation.

23. The method of claim 22, wherein the plurality of convolutional layers comprises:

a first convolutional layer coupled to a first maximum pooling layer, the first convolutional layer being padded and having a first plurality of filters; and a second convolutional layer coupled to a second maximum pooling layer, the second convolutional layer being unpadded and having a second plurality of filters.

24. The method of claim 23, wherein the first plurality of filters comprises at least eight filters.

* * * * *